United States Patent [19]
Inoue

[11] Patent Number: 5,973,301
[45] Date of Patent: Oct. 26, 1999

[54] TRANSPARENT HEATING INSTRUMENT FOR USE IN MICROSCOPE AND TRANSPARENT HEATING INSTRUMENT FOR EXAMINING OBJECT

[75] Inventor: Tamotsu Inoue, Shizuoka, Japan

[73] Assignee: Kabushiki Kaisha Kitazato Supply, Fujinomiya, Japan

[21] Appl. No.: 09/069,175

[22] Filed: Apr. 29, 1998

[30] Foreign Application Priority Data

Apr. 30, 1997 [JP] Japan ..................................... 9-127896

[51] Int. Cl.⁶ ....................................................... H05B 3/06
[52] U.S. Cl. ......................... 219/522; 219/542; 219/544; 219/548
[58] Field of Search ..................................... 219/522, 542, 219/203, 544, 548; 359/512; 338/308, 309, 306

[56] References Cited

U.S. PATENT DOCUMENTS

| | | |
|---|---|---|
| 3,833,451 | 9/1974 | Wagner . |
| 4,361,751 | 11/1982 | Criss et al. . |
| 4,820,902 | 4/1989 | Gillery . |
| 4,844,985 | 7/1989 | Pharms et al. . |
| 4,918,288 | 4/1990 | Carter et al. . |
| 4,957,358 | 9/1990 | Terada et al. ............................. 359/512 |
| 4,970,376 | 11/1990 | Mellor et al. ............................. 219/543 |
| 5,421,926 | 6/1995 | Yukinobu et al. ......................... 156/83 |
| 5,448,037 | 9/1995 | Takase et al. ............................. 219/547 |
| 5,458,986 | 10/1995 | Wilber et al. ............................. 428/697 |
| 5,493,102 | 2/1996 | Takase et al. ............................. 219/547 |
| 5,717,190 | 2/1998 | Inoue . |

FOREIGN PATENT DOCUMENTS

| | | |
|---|---|---|
| 0 758 756 | 2/1997 | European Pat. Off. . |
| 60-156520 | 10/1985 | Japan . |
| 3-101894 | 10/1991 | Japan . |
| WO87/03703 | 6/1987 | WIPO . |

OTHER PUBLICATIONS

Patent Abstracts of Japan, vol. 96, No. 8, Aug. 30, 1996, Japanese Application No. 08–108080.
Patent Abstracts of Japan, vol. 12, No. 499 (P–807), Dec. 27, 1988, Japanese Application No. 63–208819.

*Primary Examiner*—Teresa Walberg
*Assistant Examiner*—Vinod D. Patel
*Attorney, Agent, or Firm*—Burns, Doane, Swecker & Mathis, LLP

[57] ABSTRACT

A transparent heating instrument for use in a microscope has a transparent heat-generating plate and an annular housing accommodating the transparent heat-generating plate. The transparent heat-generating plate has a transparent plate, a transparent heat-generating conductive thin coat formed on one surface of the transparent plate, a pair of heat-generating electrodes in contact with the transparent heat-generating conductive thin coat and opposed to each other; and a transparent thin hard coat (transparent thin hard coat) covering the transparent heat-generating conductive thin coat and having substantially insulating property.

30 Claims, 16 Drawing Sheets

F I G. 4
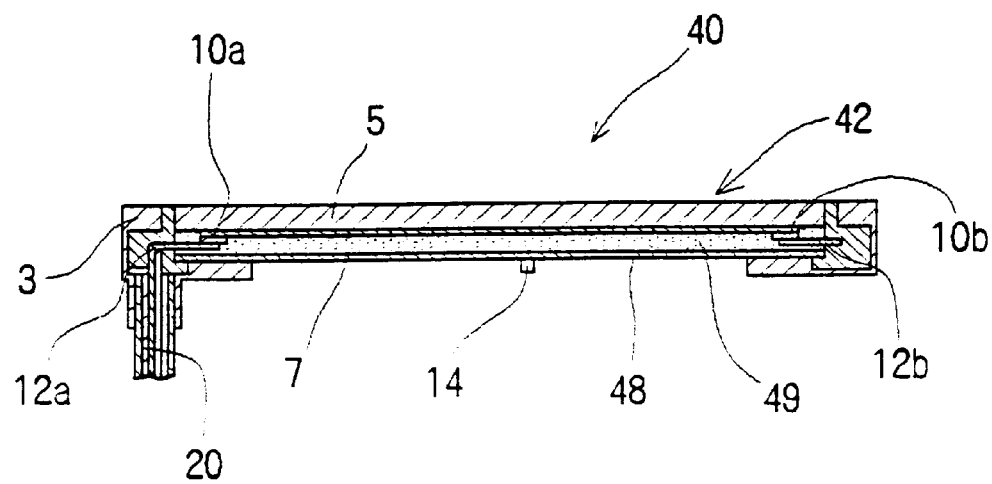
F I G. 5
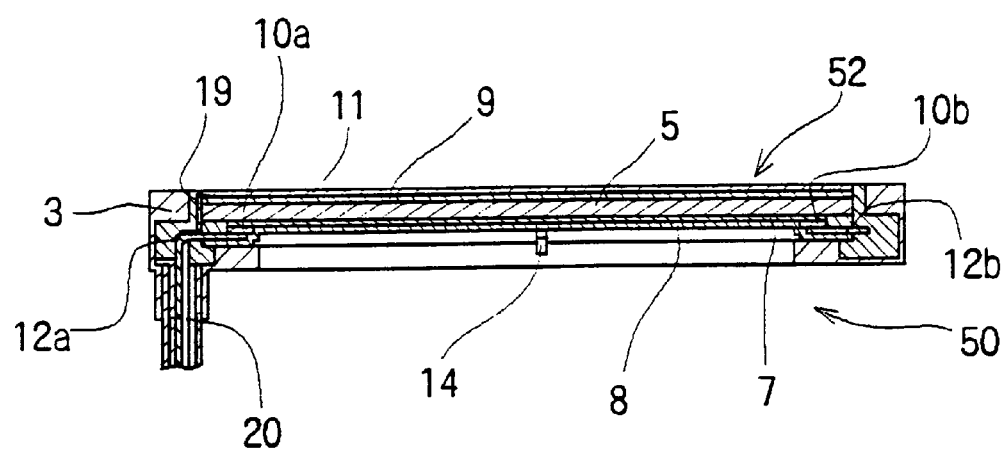

F I G. 16
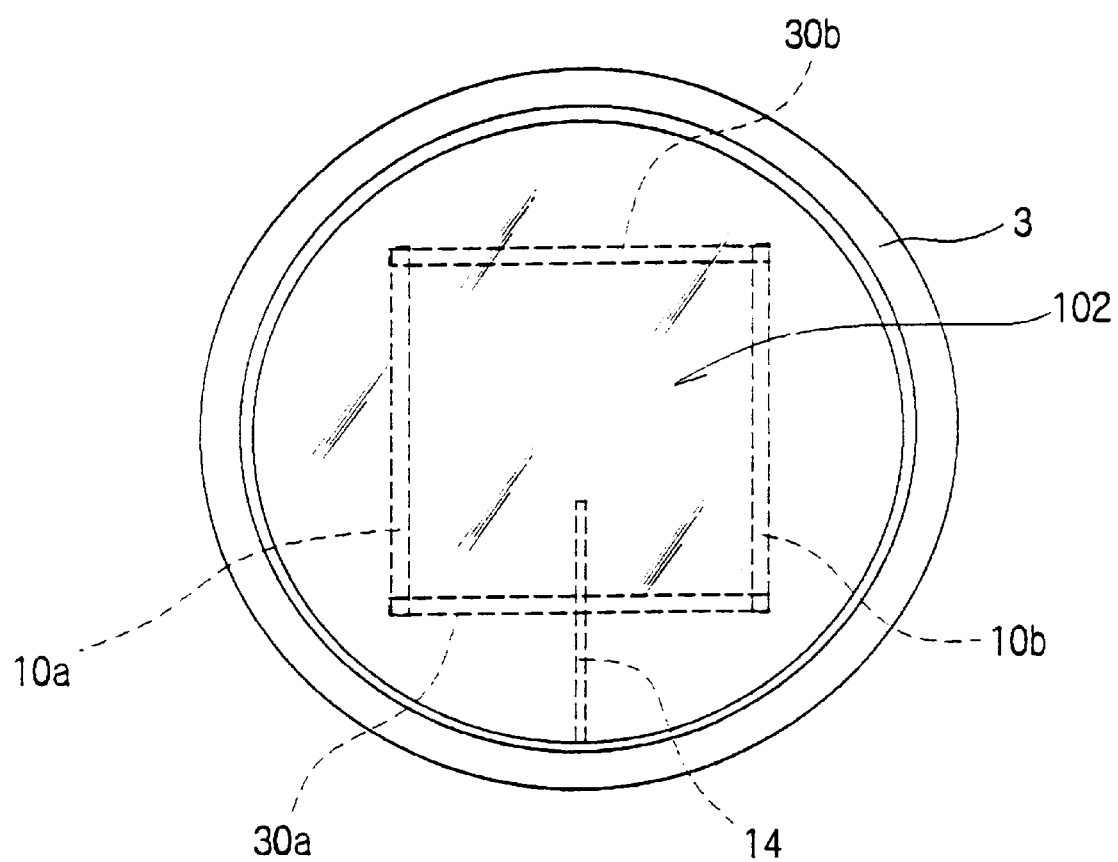

TRANSPARENT HEATING INSTRUMENT FOR USE IN MICROSCOPE AND TRANSPARENT HEATING INSTRUMENT FOR EXAMINING OBJECT

BACKGROUND OF THE INVENTION

The present invention relates to a transparent heating instrument, for use in a microscope, for heating a to-be-examined object which is placed thereon and a culture dish and a transparent heating instrument for examining an object with naked eye.

Artificial insemination is conventionally put in practice for breeding of a stock. It also has been put in practice for the human race for the purpose of treating infertility. For such artificial insemination, it is necessary to examine the vitality and appearance of the sperm to be introduced with a microscope and confirm the faultlessness of the sperm beforehand. Since sperm generally has the optimum activity at 37° C. to 38° C. though it varies according to the species of animals, it is preferable to perform the examination at this temperature.

For this purpose, the inventors of the present invention proposed a heating for microscopic examination described in International Publication No. WO87/3703. This heating device comprises a heater stage and a heating means. The heater stage has a transparent conductive film between top and bottom transparent glass plates.

In recent years, an inverted microscope has come into wide use. Since the lens system is disposed below the stage in the inverted microscope, it is preferable that a through hole is formed at the center part of the stage. By the through hole thus formed, checking of the magnification lens of the inverted microscope is made easier. Thus, it is preferable to form the through hole at substantially the central part of the transparent heating plate for the microscope, too.

The present inventors have found that it is unnecessary to form such a through hole if a thin transparent heating plate can be provided. But the thin transparent heating plate is not rigid.

Thus, it is a first object of the present invention to provide a transparent heating instrument, for use in a microscope, which allows a heating plate to be sufficiently thin; does not interrupt the rotation of a magnification lens when the transparent heating instrument is fixed to the stage of an inverted microscope even though it does not have a through hole at the center part thereof; and has a high strength.

As described above, in recent years, an inverted microscope has come into wide use. In the inverted microscope, the lens system is positioned below the stage. The transparent heating instrument installed on the stage has a cord for electrification. The cord extends downward from the lower surface of a frame-shaped housing of the transparent heating instrument. Thus, it occurs that the magnification lens gets caught by the cord while the magnification lens is being operated.

Thus, it is a second object of the present invention to provide a transparent heating instrument which prevents the magnification lens of the microscope from being caught by the cord thereof.

In the conventional transparent heating instrument, a conductive wire is fixed to an electrode of a transparent heating plate with conductive adhesive agent. Thus, the transparent heating plate cannot be heated to a temperature higher than the heat-resistant temperature of the conductive adhesive agent. That is, the conventional transparent heating instrument cannot be used at a high temperature.

Thus, it is a third object of the present invention to provide a transparent heating instrument which can be heated to a temperature higher than the heat-resistant temperature of the conductive adhesive agent.

SUMMARY OF THE INVENTION

In order to achieve the first object, there is provided a transparent heating instrument for use in a microscope of the present invention comprising a transparent heat-generating plate having: a transparent plate; a transparent heat-generating conductive thin coat formed on one surface of the transparent plate; a pair of heat-generating electrodes in contact with the transparent heat-generating conductive thin coat and opposed to each other; and a transparent thin hard coat covering the transparent heat-generating conductive thin coat and having substantially insulating property It is preferable that the transparent plate has a heat-ungenerating (e.g., a non-heat generating) transparent conductive thin coat formed on the other surface of the transparent plate; a ground cord in contact with the heat-ungenerating transparent conductive thin coat; and a second transparent thin hard coat covering the heat-ungenerating transparent conductive thin coat and substantially insulating. It is preferable that the heat-ungenerating transparent conductive thin coat covers substantially the entirety of the other surface of the transparent plate.

In order to achieve the first object, there is provided a transparent heating instrument for use in a microscope of the present invention comprising a transparent heat-generating plate having an ultraviolet ray-permeable transparent plate; a transparent heat-generating conductive thin coat formed on one surface of the ultraviolet ray-permeable transparent plate; a pair of heat-generating electrodes in contact with the transparent heat-generating conductive thin coat and opposed to each other; a transparent heat-generating conductive thin coat-unformed portion (e.g., a portion having no coating formed thereon) formed on the one surface, of the ultraviolet ray-permeable transparent plate, on which the transparent heat-generating conductive thin coat is formed; and a transparent thin hard coat covering the transparent heat-generating conductive thin coat and substantially insulating.

In order to achieve the second object, there is provided a transparent heating instrument for use in a microscope of the present invention comprising a transparent heat-generating plate having: a transparent plate; a transparent heat-generating conductive thin coat formed on one surface of the transparent plate; a pair of heat-generating electrodes in contact with the transparent heat-generating conductive thin coat and opposed to each other; and conductive wires each fixed to each of the heat-generating electrodes. The transparent heat-generating plate further has a housing holding a periphery of the transparent heat-generating plate and having an opening for taking out the conductive wires therefrom; and a deformable member capable of holding the conductive wires taken out from the opening in a desired shape.

In order to achieve the third object, there is provided a transparent heating instrument for high temperature, comprising a transparent heat-generating plate having: a heat-resistant transparent plate; a transparent heat-generating conductive thin coat formed on one surface of the transparent plate; a pair of heat-generating electrodes in contact with the transparent heat-generating conductive thin coat and opposed to each other; and conductive wires each fixed to each of the heat-generating electrodes. The transparent heat-generating plate has a heatable region which can be heated by electrification and an unbeatable region which is not heated by electrification. Each of a pair of the heat-generating electrodes has a portion positioned in the heatable region and a portion positioned in the unheatable region. Each of the conductive wires is fixed to each of the heat-generating electrodes in the unbeatable region.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIG. 4 is a sectional view showing a transparent heating instrument, for use in a microscope, according to another embodiment of the present invention;

FIG. 5 is a sectional view showing a transparent heating instrument, for use in a microscope, according to an embodiment of the present invention;

FIG. 16 is a plan view showing a transparent heating instrument, for use in a microscope, according to another embodiment of the present invention;

DETAILED DESCRIPTION OF PREFERRED EMBODIMENTS

The transparent heating instrument of the present invention for use in a microscope will be described below with reference to the drawings.

The transparent heating instrument of the present invention will be described below by way of an embodiment in which it is applied to a transparent heating instrument for use in a microscope. The transparent heating instrument for use in a microscope serves as a plate for supporting a specimen which is examined by the microscope.

Figure 1:
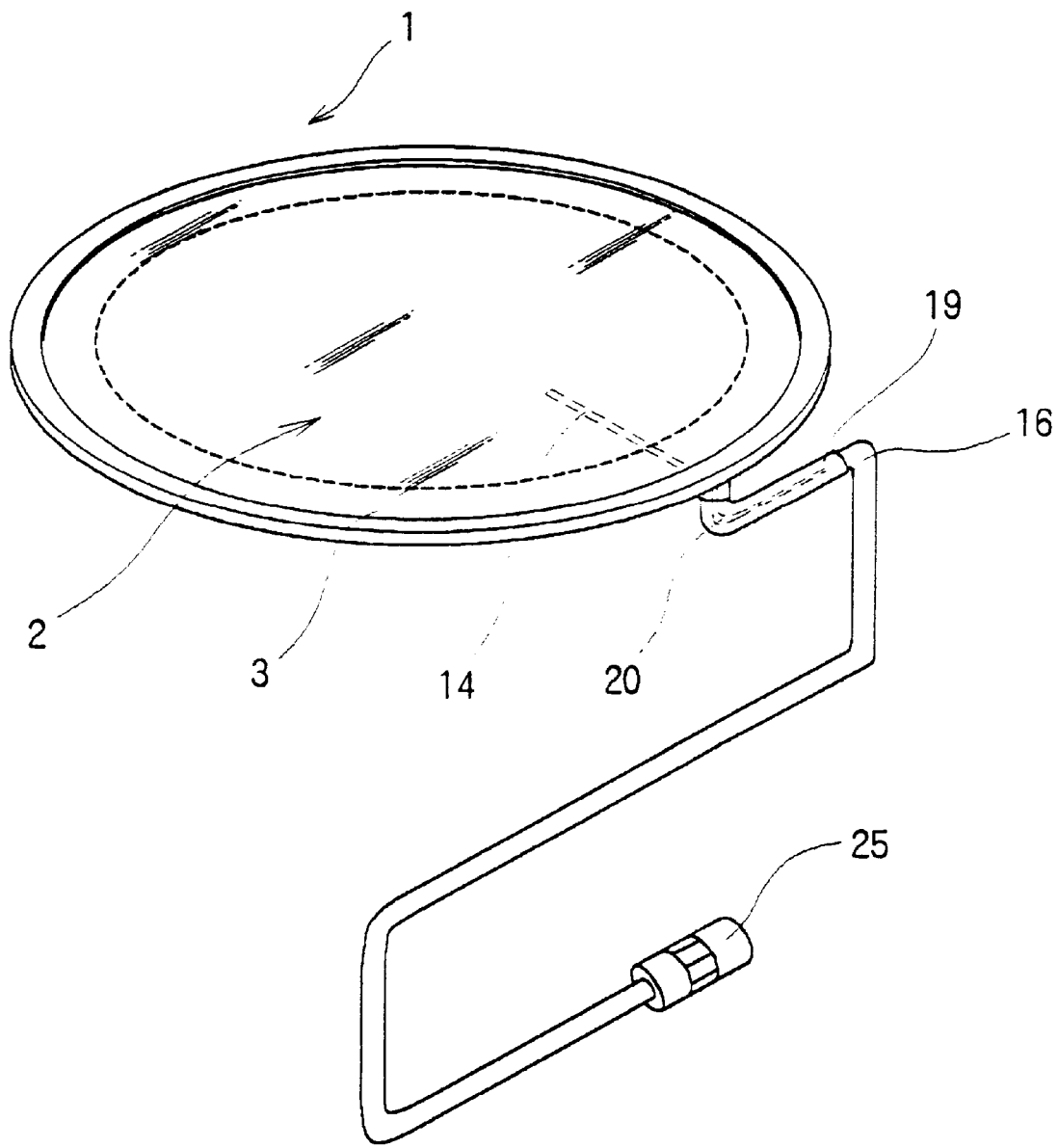
FIG. 1 is a perspective view showing a transparent heating instrument, for use in a microscope, according to an embodiment of the present invention.
Figure 2:
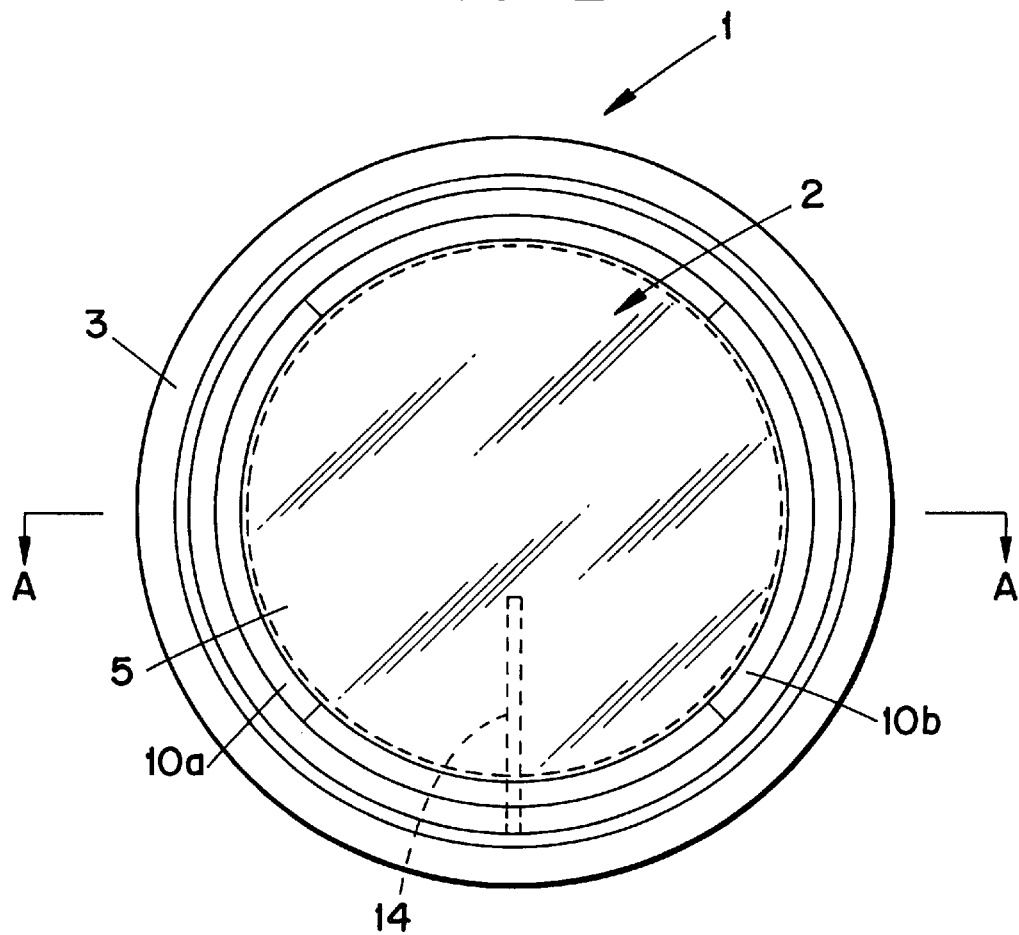
FIG. 2 is a front view showing the transparent heating instrument, for use in a microscope, according to the embodiment of the present invention.

As shown in FIGS. 1 and 2, a transparent heating instrument 1 for use in a microscope (hereinafter referred to as merely transparent heating instrument 1) of the embodiment comprises a transparent heat-generating plate 2 and an annular housing 3 accommodating the transparent heat-generating plate 2.

The transparent heat-generating plate 2 comprises a transparent plate 5; a transparent heat-generating conductive thin coat 7 or a transparent heat-generating conductive thin film formed on one surface of the transparent plate 5; a pair of heat-generating electrodes 10a and 10b in contact with the transparent heat-generating conductive thin coat 7 and opposed to each other; and a transparent thin hard coat 8 covering the transparent heat-generating conductive thin coat 7 and having substantially insulating property.

The transparent heating instrument 1 has a temperature sensor 14 fixed to the lower surface of the transparent heat-generating plate 2.

Figure 3:
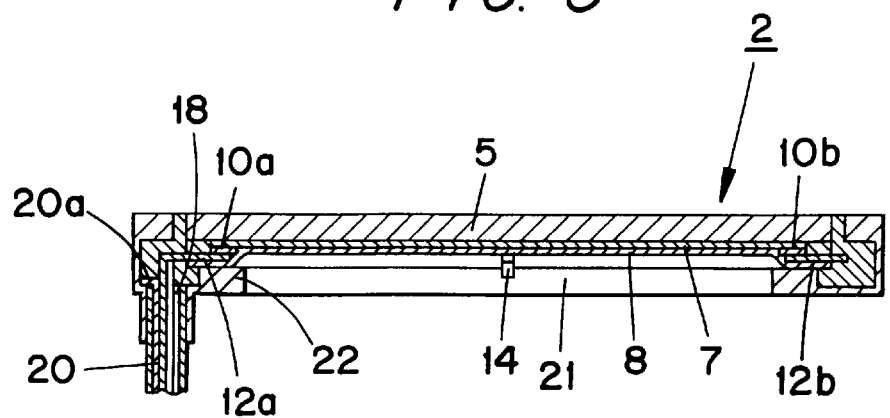
FIG. 3 is a sectional view taken along a line A—A of FIG. 2.

In the embodiment, the transparent plate 5 is circular. As shown in FIG. 3, the transparent heat-generating conductive thin coat 7 is formed on one surface of the transparent plate 5, namely, on the entire lower surface thereof except the periphery of the lower surface thereof. There is formed on the transparent plate 5 a pair of the heat-generating electrodes 10a and 10b which are opposed to each other, circular arc-shaped in correspondence to the shape thereof, and each of which has a length about ¼ of the circumference thereof. The transparent plate 5 has a region, along its periphery, in which the opposed heat-generating electrodes 10a and 10b are not formed. The temperature sensor 14 is installed on the transparent plate 5 at a position thereof corresponding to the portion in which the heat-generating electrodes 10a and 10b are not formed.

As the transparent plate 5, a glass plate or a synthetic resinous plate transparent and having insulating property is used. Any transparent and insulating synthetic resinous plates can be used. It is favorable to use an acrylic la plate, a polycarbonate plate, a styrene plate or the like having a high degree of transparency. Those which are transparent and rigid are more favorable. The glass plate can be favorably used as the transparent plate 5 because the degree of its transparency is high and its thermal conductivity is not so high The glass plate can be formed of alkali-contained glass such as soda lime silicate glass, aluminosilicate glass, borosilicate glass, and lithium aluminosilicate glass; lower alkali-contained glass; non-alkali contained glass; and silica glass. It is favorable to use the transparent plate 5 having a thickness leas than 0.8 mm. It is more favorable to use the transparent plate 5 having a thickness in the range of 0.2–0.6 mm. It is favorable to use the transparent heat-generating plate 2 having a thickness less than 1 mm. It is more favorable to use the transparent heat-generating plate 2 having a thickness in the range of 0.2–0.6 mm.

The shape of the transparent plate 5 is not limited to a circle. The circularity includes a true circle, an ellipse, and an elongated circle. The transparent plate 5 may be polygonal, e.g., quadrangular, hexagonal or the like. The heat-generating electrodes 10a and 10b may be greater or smaller than ¼ of the circumference of the transparent plate 5.

The transparent heat-generating conductive thin coat 7 is formed of a conductive thin metal film. Materials which generate heat when they are electrified can be used as the conductive thin metal film. Tin oxide, $SiO_2$-indium alloy, indium oxide, tin-doped or antimony-doped indium oxide, antimony-doped tin oxide can be preferably used as the material of the conductive thin metal film. The following methods can be utilized to form the conductive thin metal film (ITO film) on the lower surface of the transparent plate 5: Vapor deposition method (for example, vacuum vapor deposition), sputtering method, vacuum film forming method such as ion plating method, hydrolysis reaction, chemical vapor deposition method (CVD method) such as thermal decomposition reaction or dipping method.

The heat-generating electrodes 10a and 10b consist of a highly conductive thin coat made or metal such as copper or silver bonded to the predetermined region of the lower surface of the transparent plate 5 or consist of a highly conductive thin coat made of metal such as copper or silver deposited in a thin layer on the predetermined position of the lower surface of the transparent plate 5 by vapor deposition method (for example, vacuum vapor deposition), sputtering method, vacuum film forming method such as ion plating method, hydrolysis reaction, chemical vapor deposition method (CVD method) such as thermal decomposition reaction or dipping method. Conductive wires 12a and 12b are connected with the heat-generating electrodes 10a and 10b, respectively. The conductive wires 12a and 12b and the temperature sensor 14 are electrically connected with a temperature controller 31 which will be described later, when the transparent heating instrument 1 is used.

The transparent plate 5 has a region, in the entire periphery thereof, in which the transparent heat-generating conductive thin coat 7 is not formed. The heat-generating electrodes 10a and 10b are also positioned inward at predetermined intervals from the periphery of the transparent plate 5. That is, there is formed a region, in the entire periphery of the transparent plate 5, in which the heat-generating electrodes 10a and 10b and the transparent heat-generating conductive thin coat 7 are not formed. This construction prevents electromagnetic waves generated by the heat-generating electrodes 10a and 10b and the transparent heat-generating conductive thin coat 7 from traveling above the transparent plate 5. That is, the construction prevents the electromagnetic waves generated by the heat-generating electrodes 10a and 10b and the transparent heat-generating conductive thin coat 7 from adversely affecting a to-be-examined object placed on the transparent plate 5. The radial distance between the periphery of the transparent plate 5 and the periphery of the heat-generating electrodes 10a and 10b as well as the transparent heat-generating conductive thin coat 7 is favorably 0.5–10 mm and more favorably 1–5 mm.

The transparent thin hard coat 8 coating the entire transparent heat-generating conductive thin coat 7 is formed on the lower surface of the transparent plate 5. The transparent thin hard coat 8 is made of a material substantially insulating. In the embodiment, the transparent thin hard coat 8 coats the entire heat-generating electrodes 10a and 10b and the periphery, of the transparent plate 5, in which the transparent heat-generating conductive thin coat 7 is not formed. The transparent thin hard coat 8 protects the lower surface of the transparent plate 5 from being damaged easily and allows the transparent heat-generating plate 2 to have a sufficient degree of strength, although it is as thin as less than 1 mm.

It is favorable that the transparent thin hard coat 8 is formed of any one of zirconium oxide ($ZrO_2$), alumina ($Al_2O_3$), silicon oxide ($SiO_2$), titanium carbide or a composite containing two or more of these substances as a main component. It is more favorable that the transparent thin hard coat consists of any one of zirconium oxide ($ZrO_2$), alumina ($Al_2I_3$) or silicon oxide ($SiO_2$). The transparent thin hard coat 8 may be formed of silicon hard coating agent cured on the surface of the the transparent plate 5. The cured silicon hard coating agent is formed of a crosslinked material which is formed as a result of reaction of silanol groups of condensate resulting from hydrolysis of organoalkoxysilane when the condensate is heated. The resulting transparent thin hard coat comprises silicon oxide ($SiO_2$) and organic groups (alkyl group, for example, methyl group, ethyl group) connected with a part of the network structure of the silicon oxide ($SiO_2$).

In order to form the transparent tin hard coat 8, a material selected from the above-described materials is deposited on a surface having the conductive thin coat 7 of the transparent plate 5 by vapor deposition (for example, vacuum vapor deposition), sputtering method, vacuum film forming method such as ion plating method, hydrolysis reaction, chemical vapor deposition method (CVD method) such as thermal decomposition reaction, dipping method or coating method (for example, spray method, rolling method, spinner method). Then, the deposited material is cured by heating method, plasma method or left at the room temperature. It is preferable that the transparent thin hard coat 8 has a thickness in the range of 0.01–100 $\mu$m.

The transparent thin hard coat can be formed by the following methods: For example, at 300° C., in argon atmosphere, at a vacuum degree of $5.0\times10^{-1}$ Pa, and by the application of high frequency wave-electric power of 500W, $SiO^2$, $ZrO_2$ or $Al_2O_3$ is formed by sputtering on a glass plate on which the transparent heat-generating conductive thin coat 7 has been formed. Further, a predetermined amount of condensate resulting from hydrolysis of organoalkoxysilane such as polytetraethoxysilane or the like is dissolved in an organic solvent such as ethanol. Then, by spray method, rolling method or spinner method, the solution is applied in a thickness of 0.1–10 $\mu$m to a glass plate on which the transparent heat-generating conductive thin coat 7 has been formed. Then, the content is dried at about 50° C. for 10 minutes and then sintered at 350–450° C. for a predetermined period of time. As a result, a crosslinked cured film of SiO containing organic groups to some extent can be formed.

It is preferable that the transparent thin hard coat is formed of substantially inorganic materials but it may be formed of transparent resin. As the transparent hardening resin, the following resins can be used: Melamine resin, guanamine resin, amino resin, hardening acrylic resin, hardening isocyanate acrylic resin, thermoseting styrene resin, polyurethane resin, and epoxy resin.

As shown in FIG. 3, the housing 3 has an opening 21 formed in the center part thereof; a transparent heat-generating plate-placing portion 22 so formed that it surrounds the opening 21; and an opening portion 18 through which a connection cord connected with the heat-generating electrodes 10a and 10b and the temperature sensor 14 passes.

The temperature sensor 14 is so provided that it contacts the lower surface of the transparent heat-generating plate 2. The temperature sensor 14 may be provided inside the transparent heat-generating plate 2 or on the upper surface thereof. Any sensors capable of detecting temperature can be used as the temperature sensor 14. A thermocouple, a thermistor or the like can be preferably used as the temperature sensor 14.

The conductive cords 12a and 12b connected with the heat-generating electrodes 10a and 10b, respectively and the signal conductor connected with the temperature sensor 14 are bundled as a cord 16 extending to the outside from the opening portion 18 of the housing 3. A connector 25 is installed at one end of the cord 16, thus forming a connection terminal which is connected with the temperature controller 31 which will be described later.

In the transparent heating instrument 1 of the embodiment, the housing 3 has the opening portion 18 for taking out the conductive cords 12a and 12b from the housing 3, as described above. The transparent heating instrument 1 has a deformable member 20 or a metal cord 20 capable of holding the conductive cords 12a and 12b, in a desired shape, taken out from the opening portion 18 to the outside. More specifically, a tube 19 whose one end thereof is positioned inside the opening portion 18 extends outward. The cord 16 containing the conductive cords 12a and 12b extends through the inside of the tube 19. The tube 19 accommodates the metal cord 20 (for example, wire) whose one end is fixed to the inside of the opening portion 18 of the housing 3 or is provided with a locking portion 20a serving as a means for preventing the metal cord 20 parallel with the cord 16 from being removed from the housing 3. As the metal cord 20, a wire so plastically deformable as to bent by hands is used. The number of wires of the metal cord 20 may be one or plural When the metal cord 20 consists of one wire, its diameter is preferably 2–7 mm. When the metal cord 20 consists of a plurality of wires, the diameter of one wire is preferably 1–5 mm. The deformable member 20 is not limited to a metal wire. For example, a metal plate so wide as to be accommodated in the tube 19, namely, a metal plate having a width smaller than the diameter of the tube 19 can be used. The deformable member 20 is not limited to the above-described mode. For example, when the above-described tube 19 is used, a plastically deformable metal wire or a plastically deformable metal plate may be wound around the tube 19 or around the cord 16. In this case, the metal wire or the metal plate is located between the tube 19 and the cord 16. When the tube 19 is not used, a plastically deformable metal wire or a plastically deformable metal plate may be wound around the cord 16. Stainless steel, copper or the like is used as the material of the metal wire or that of the metal plate.

Figure 11:
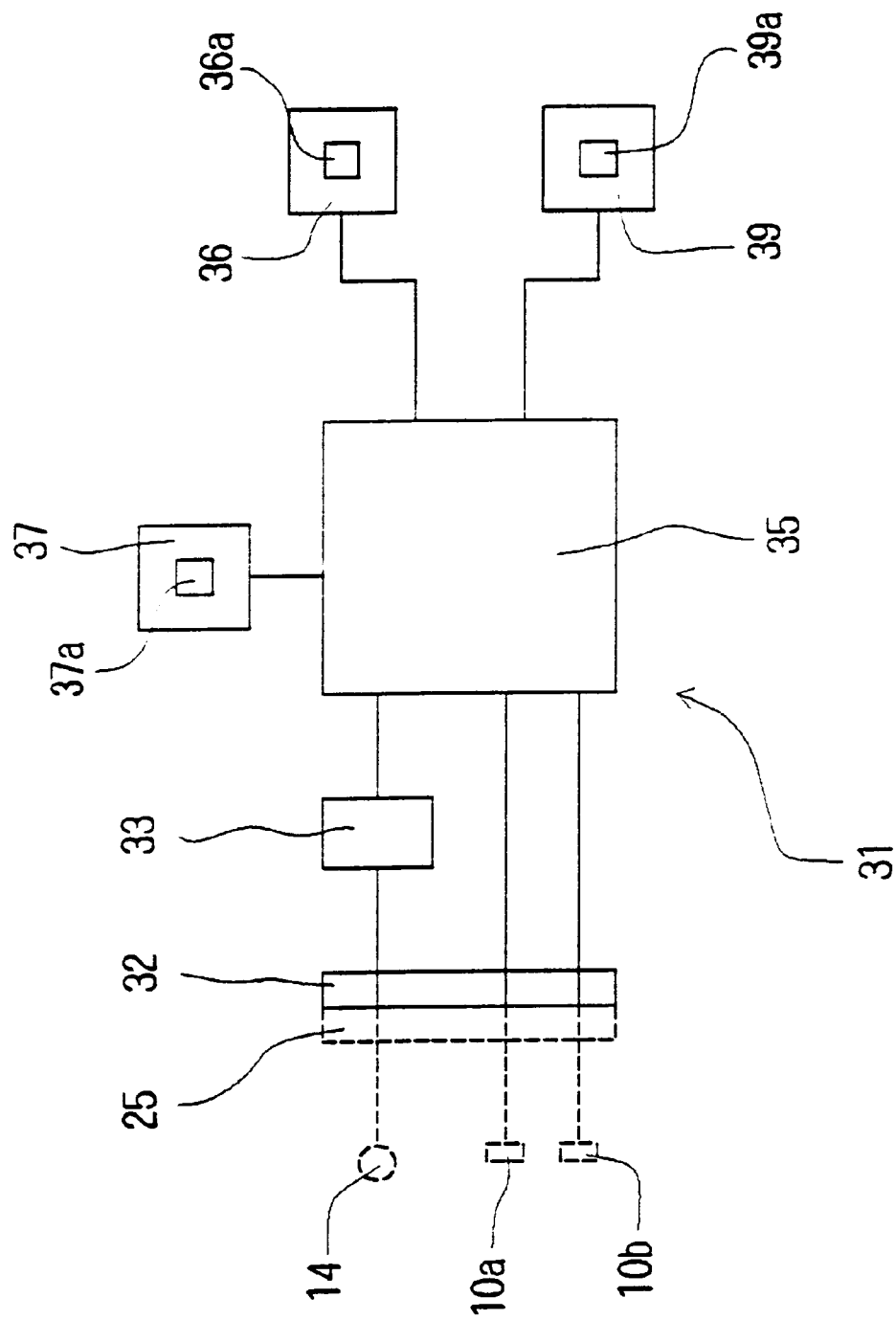
FIG. 11 is an example of a block diagram of a temperature controller which is used in the transparent heating apparatus, for use in a microscope, of the present invention.

The transparent heating instrument 1 is used by incorporating it in the stage of a microscope. A temperature control device comprises the transparent heating instrument 1 and the temperature controller 31. FIG. 11 is a block diagram showing the temperature controller 31 which is used for the transparent heating instrument of the present invention. As shown in FIG. 11, the temperature controller 31 comprises a connector 32 which can be connected with the connector 25 of the transparent heating instrument (supporting plate for supporting specimen to be examined under microscope) 1; an A/D converter 33 for converting analog signals detected by the temperature sensor 14 of the transparent heating instrument 1 into digital signals; a temperature control portion 35 to which the digital signals are inputted from the converter 33; a measured temperature display portion 36 displaying a measured temperature of the transparent heat-generating plate 2 inputted thereto from the temperature control portion 35; a set temperature input portion 37 to which a set temperature is inputted; and a set temperature display portion 39 displaying the set temperature inputted thereto from the set temperature input portion 37. The temperature control portion 35 is electrically connected with the heat-generating electrodes 10a and 10b which contact the transparent heat-generating conductive thin coat 7 through the connector 32 of the temperature controller 31 and through the connector 25 of the transparent heating instrument 1 and has a function of adjusting the temperature of the transparent heat-generating conductive thin coat 7. The set temperature input portion 37 has an input switch 37a. The measured temperature display portion 36 also has a display window 36a. The set temperature display portion 39 also has a display window 39a. The temperature control portion 35 has a comparison function of comparing a measured temperature with a set temperature and also has a temperature adjusting function (namely, electric power supply adjusting function) of adjusting the state of the electric power which is supplied to the transparent heat-generating conductive thin coat 7, based on a result obtained by the comparison function. The temperature of the transparent heat-generating conductive thin coat 7 can be adjusted by means of a voltage which is applied to the transparent heat-generating conductive thin coat 7, electric current which is applied thereto or the ON/OFF thereof.

The temperature control portion 35 controls the ON/OFF of the transparent heat-generating conductive thin coat 7 as follows: If it is determined that a measured temperature is lower than a set temperature inputted thereto from the set temperature input portion 37, the temperature control portion 35 issues an instruction of electrifying the transparent heating instrument, whereas if it is determined that the measured temperature is higher than the set temperature inputted thereto from the set temperature input portion 37, the temperature control portion 35 issues an instruction of unelectrifying the transparent heating instrument. Further, when the temperature of the transparent heat-generating conductive thin coat 7 is controlled not by ON/ OFF, the temperature control portion 35 controls the temperature of the transparent heat-generating conductive thin coat 7 as follows: If it is determined that the measured temperature is lower than the set temperature inputted thereto from the set temperature input portion 37, the temperature control portion 35 issues an instruction of increasing a voltage or electric current, whereas if it is determined that the measured temperature is higher than the set temperature inputted thereto from the set temperature input portion 37, the temperature control portion 35 issues an instruction of decreasing a voltage or electric current or suspending the supply of electric current temporarily. If it is determined that the measured temperature is equal to the set temperature, the temperature control portion 35 issues an instruction of maintaining the voltage or the electric current being applied currently.

A transparent heating instrument 40, of an embodiment, for use in a microscope (hereinafter referred to as merely transparent heating instrument 40) will be described below with reference to FIG. 4.

The construction of the transparent heating instrument 40 of the embodiment is the same as that of the transparent heating instrument 1 shown in FIGS. 1 through 3 except the construction of a transparent heat-generating plate 42. In the transparent heating instrument 40, a transparent thin film 48 of the transparent heat-generating plate 42 is formed of a transparent resinous film. The transparent resinous film having a thickness of 0.05–0.2 mm is used in the embodiment. The transparent resinous film is formed of a substantially insulating material. As the material of the transparent resinous film, the following materials can be used: Polyester film (more specifically, polyethylene terephthalate film), a polycarbonate film, a polyolefin film (for example, polyethylene film, polypropylene film), and polyvinylidene film (more specifically, polyvinylidene fluoride film and polyvinylidene chloride). It is preferable that the transparent resinous film is stretched in consideration of the strength and the uniformity of the thickness thereof. A biaxially oriented film is more favorable than a stretched film in consideration of strength.

The transparent resinous film forming the transparent thin film 48 covers the entire transparent heat-generating conductive thin coat 7 formed on the lower surface of a transparent plate 5. In the embodiment, the transparent thin film 48 covers the entire electrodes 10a and 10b and the periphery of the transparent plate 5 in which the transparent heat-generating conductive thin coat 7 is not formed.

The transparent thin film 48 is bonded to the lower surface of the transparent plate 5 with adhesive agent. Although an adhesive layer 49 is drawn thinly in FIG. 4, the thickness of the adhesive layer 49 is actually small because it is required to merely serve as a means for bonding the transparent thin film 48 to the transparent plate 5. The following adhesive agent can be preferably used because they are substantially insulating: Hot melt adhesive agent, RTV silicon adhesive agent, and LTV silicon adhesive agent.

The constructions of other parts of the transparent heating instrument 40 of the embodiment are the same as those of the transparent heating instrument 1 described above. It is favorable to use the transparent heat-generating plate 42 having a thickness less than 1 mm. It is more favorable to use the transparent heat-generating plate 42 having a thickness in the range of 0.2–0.6 mm.

A transparent heating instrument 50, of an embodiment, for use in a microscope (hereinafter referred to as merely transparent heating instrument 50) will be described below with reference to FIG. 5.

The construction of the transparent heating instrument 50 of the embodiment is the same as that of the transparent heating instrument 1 shown in FIGS. 1 through 3 except the construction of a transparent heat-generating plate 52.

In the transparent heat-generating plate 52, a transparent plate 5 has a heat-ungenerating transparent conductive thin coat 9 formed on a surface (upper surface on which a transparent heat-generating conductive thin coat 7 is not formed) of the transparent plate 5; a ground cord 19 in contact with the heat-ungenerating transparent conductive thin coat 9; and a second transparent thin hard coat 11 covering the heat-ungenerating transparent conductive thin coat 9 and substantially insulating.

The heat-ungenerating transparent conductive thin coat 9 is formed on the entire upper surface of the transparent plate 5, including the portion thereof corresponding to the periphery of the transparent heat-generating conductive thin coat 7. That is, the heat-ungenerating transparent conductive thin coat 9 covers the entire upper surface of the transparent plate 5. The heat-ungenerating transparent conductive thin coat 9 ("heat-ungenerating" meaning, e.g., a non-heat generating coat or a coat not required to generate heat) may be formed of the same material as that of the transparent heat-generating conductive thin coat 7 shown in FIGS. 1 through 3. Because the heat-ungenerating transparent conductive thin coat 9 is not required to generate heat when it is electrified, it may be formed of a material having a resistance lower than that of the transparent heat-generating conductive thin coat 7.

The heat-ungenerating transparent conductive thin coat 9 can be preferably formed of the following materials: Gold, copper, tin oxide, $SiO_2$ indium alloy, indium oxide, tin-doped indium oxide or antimony-doped indium oxide, antimony-doped tin oxide. The following methods can be utilized to form the conductive metal film (ITO film) on the upper surface of the transparent plate 5: Vapor deposition method (for example, vacuum vapor deposition), sputtering method, vacuum film forming method such as ion plating method, hydrolysis reaction, chemical vapor deposition method (CVD method) such as thermal decomposition reaction or dipping method.

The ground cord 19 is connected with the heat-ungenerating transparent conductive thin coat 9. Electromagnetic waves which have collided with the upper surface of the transparent plate 5 and reached the heat-ungenerating transparent conductive thin coat 9 flow through the ground cord 19, thus disappearing.

The second transparent thin hard coat 11 covering the heat-ungenerating transparent conductive thin coat 9 is formed on the upper side of the transparent plate 5. As the material of the second transparent thin hard coat 11, the same materials as those of the transparent thin hard coat 8 of the transparent heating instrument 1 can be preferably used. As the transparent thin hard coat, the following materials can be favorably used: Zirconium oxide ($ZrO_2$), alumina ($Al_2O_3$), silicon oxide ($SiO_2$), titanium carbide, and a composite containing two or more of these substances as a main component. It is more favorable that the transparent thin hard coat made of any one of zirconium oxide ($ZrO_2$), alumina ($Al_2O_3$), and silicon oxide ($SiO_2$).

The transparent thin hard coat 8 may be formed of silicon hard coating agent cured on the surface of the the transparent plate 5. The cured silicon hard coating agent is formed of a crosslinked material which is formed as a result of reaction of silanol groups of condensate resulting from hydrolysis of organoalkoxysilane when the condensate is heated. The resulting transparent thin hard coat comprises silicon oxide. ($SiO_2$) and organic groups (alkyl group, for example, methyl group, ethyl group) connected with a part of the network structure of the silicon oxide ($SiO_2$).

In order to form the transparent thin hard coat 11, a material selected from the above-described materials is deposited on the lower surface of the transparent plate 5 by vapor deposition (for example, vacuum vapor deposition), sputtering method, vacuum film forming method such as ion plating method, hydrolysis reaction, chemical vapor deposition method (CVD method) such as thermal decomposition reaction, dipping method or coating method (for example, spray method, rolling method, spinner method). Then, the deposited material is cured by heating method, plasma method or left at the room temperature. It is preferable that the transparent thin hard coat 11 has a thickness in the range of 0.01–100 $\mu$m.

The material of the transparent thin hard coat 8 may be different from that of the second transparent thin hard coat 11. For example, the transparent thin hard coat 8 may be formed of any one of $SiO_2$, $ZrO_2$, and $Al_2O_3$, and the second transparent thin hard coat 11 may be formed of materials other those which are used to form the transparent thin hard coat 8 and may be formed of the silicon hard coating agent. It is preferable that the second transparent thin hard coat 11 has a thickness in the range of 0.01–100 μm.

The thickness of the transparent heat-generating plate 52 is not increased much, even though the second transparent thin hard coat 11 is formed on the transparent plate 5. The second transparent thin hard coat 11 protects the upper and lower surfaces of the transparent plate 5 from being damaged easily and allows the transparent heat-generating plate 52 to have a sufficient degree of strength. The thickness of the transparent heat-generating plate 52 of the transparent heating instrument 50 is also favorably less than 1 mm and more favorably in the range of 0.2–0.6 mm. It is possible to use the transparent plate 5 having a thickness smaller than that of the transparent plate 5 of the transparent heating instrument 1 in the case where the second transparent thin hard coat 11 is formed on the upper surface of the transparent plate 5 in addition to the transparent thin hard coat 8 which is formed on the lower surface thereof.

The other constructions of the transparent heating instrument 50 of the embodiment are the same as those of the transparent heating instrument 1 described above.

A transparent heating instrument 60, of an embodiment, for use in a microscope (hereinafter referred to as merely transparent heating instrument 60) will be described below with reference to FIGS. 6 through 10.

Figure 6:
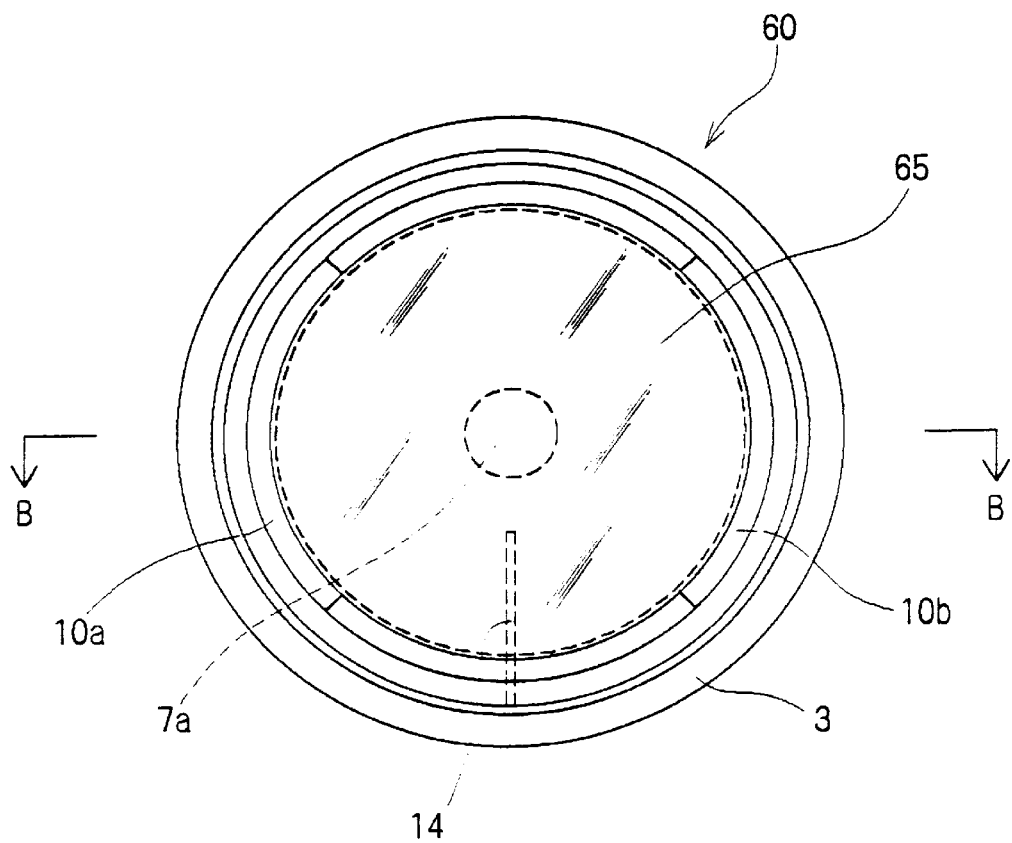
FIG. 6 is a sectional view showing a transparent heating instrument, for use in a microscope, according to another embodiment of the present invention.
Figure 7:
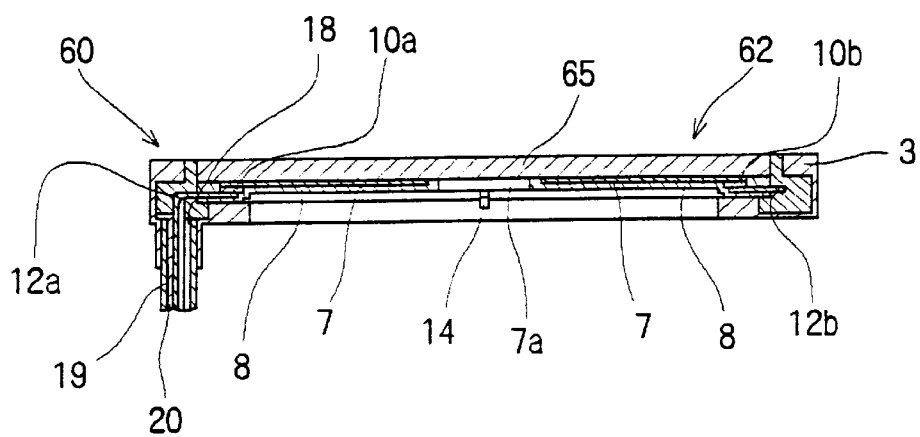
FIG. 7 is a sectional view taken along a line B—B of FIG. 6.
Figure 8:
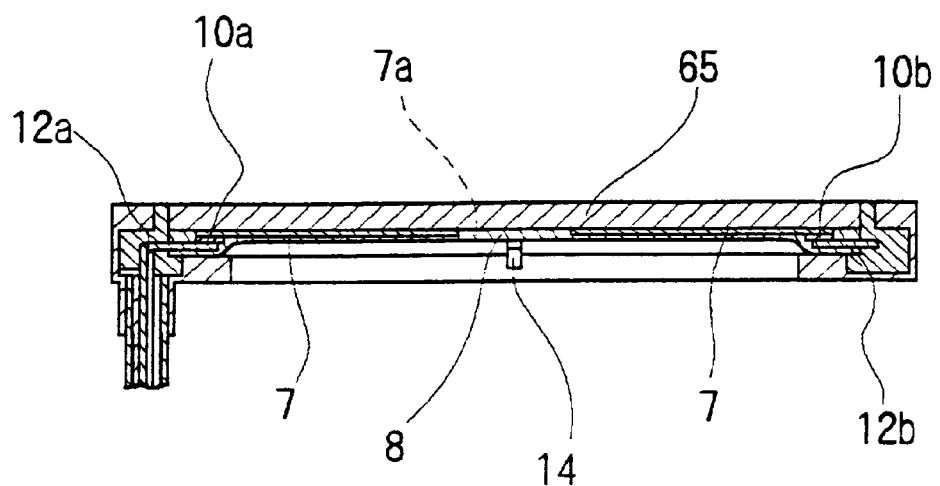
FIG. 8 is a sectional view showing a transparent heating instrument, for use in a microscope, according to another embodiment of the present invention.
Figure 9:
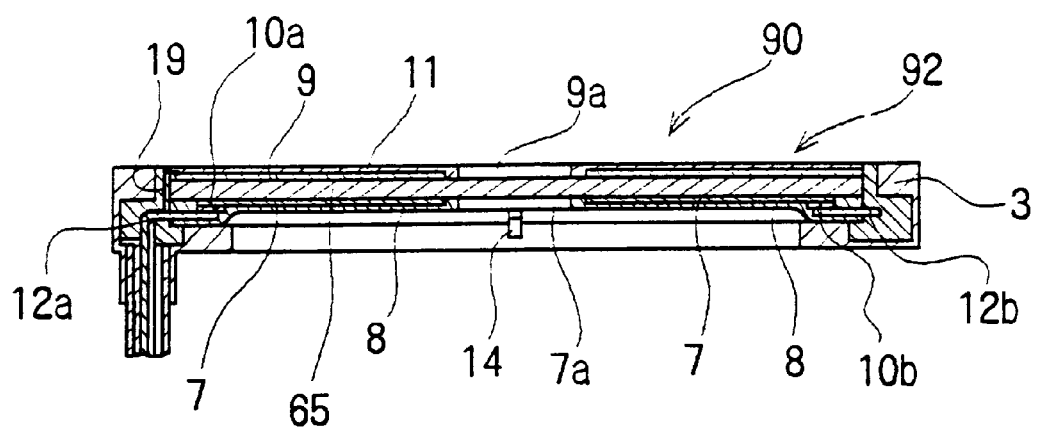
FIG. 9 is a sectional view showing a transparent heating instrument, for use in a microscope, according to another embodiment of the present invention.
Figure 10:
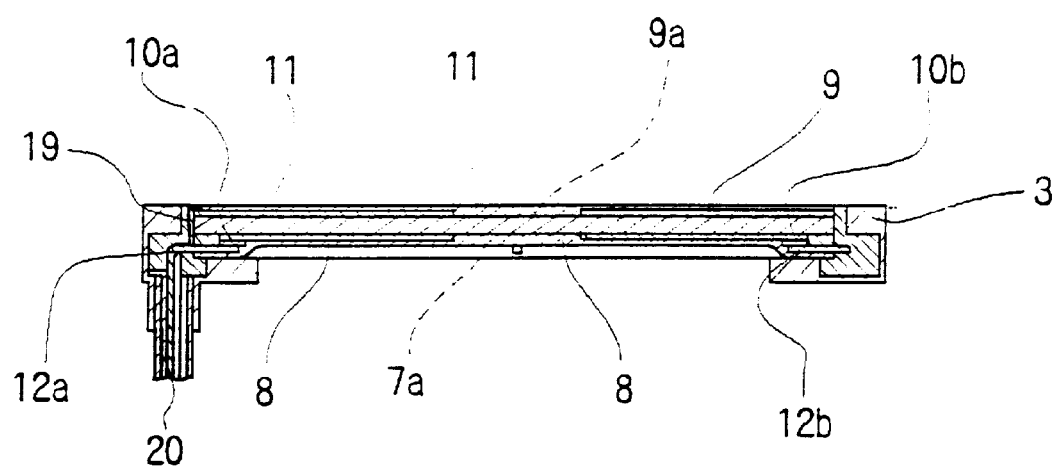
FIG. 10 is a sectional view showing a transparent heating instrument, for use in a microscope, according to another embodiment of the present invention.

FIG. 6 is a sectional view showing a transparent heating instrument, for use in a microscope, according to an embodiment of the present invention. FIG. 7 is a sectional view taken along a line B—B of FIG. 6. FIG. 8 is a sectional view showing a transparent heating instrument, for use in a microscope, according to an embodiment of the present invention. FIGS. 9 and 10 are sectional views each showing a transparent heating instrument, for use in a microscope, according to an embodiment of the present invention.

The transparent heating instrument 60 of the embodiment comprises a transparent heat-generating plate 62 having an ultraviolet ray-permeable transparent plate 65; a transparent heat-generating conductive thin coat 7 formed on one (lower) surface of the ultraviolet ray-permeable transparent plate 65; a pair of heat-generating electrodes 10a and 10b in contact with the transparent heat-generating conductive thin coat 7 and opposed to each other; a transparent heat-generating conductive thin coat-unformed portion 7a (e.g., a portion having no coating formed thereon) formed on one (lower) surface, of the ultraviolet ray-permeable transparent plate 65, on which the transparent heat-generating conductive thin coat 7 is formed; and a transparent thin hard coat 8 covering the transparent heat-generating conductive thin coat 7 and substantially insulating.

The transparent heating instrument 60 comprises the transparent heat-generating plate 62; the annular housing 3 accommodating the transparent heat-generating plate 62; and the temperature sensor 14 fixed to the lower surface of the transparent heat-generating plate 62.

In the embodiment, the ultraviolet ray-permeable transparent plate 65 is circular. The transparent heat-generating conductive thin coat 7 is formed on one surface of the ultraviolet ray-permeable transparent plate 65, namely, on the entire lower surface thereof except the periphery thereof and the center part thereof. There is formed on the ultraviolet ray-permeable transparent plate 65 a pair of the heat-generating electrodes 10a and 10b which arc opposed to each other, circular arc-shaped in correspondence to the shape thereof, and each of which has a length about ¼ of the circumference of the ultraviolet ray-permeable transparent plate 65. The ultraviolet ray-permeable transparent plate 65 has a region, along its periphery, in which the opposed heat-generating electrodes 10a and 10b are not formed. The temperature sensor 14 is installed on the ultraviolet ray-permeable transparent plate 65 at a position thereof corresponding to the portion in which the heat-generating electrodes 10a and 10b are not formed.

As the ultraviolet ray-permeable transparent plate 65, a glass plate or a synthetic resinous plate insulating and permeable to ultraviolet rays is used. Silica glass can be preferably used to form the ultraviolet ray-permeable transparent plate 65. It is favorable to use the ultraviolet ray-permeable transparent plate 65 having a thickness less than 0.8 mm. It is more favorable to use the ultraviolet ray-permeable transparent plate 65 having a thickness in the range of 0.2–0.6 mm. It is favorable to use the transparent heat-generating plate 62 having a thickness less than 1 mm. It is more favorable to use the transparent heat-generating plate 62 having a thickness in the range of 0.2–0.6 mm.

The shape of the ultraviolet ray-permeable transparent plate 65 is not limited to a circle. The circularity includes a true circle, an ellipse, and an elongated circle. The ultraviolet ray-permeable transparent plate 65 may be polygonal, e.g., quadrangular, hexagonal or the like. The heat-generating electrodes 10a and 10b may be greater or smaller than ¼ of the circumference of the ultraviolet ray-permeable transparent plate 65.

The transparent heat-generating conductive thin coat 7 is formed of a conductive thin metal film. Materials which generate heat when they are electrified can be used as the conductive thin metal film. Tin oxide, $SiO_2$ indium alloy, indium oxide, tin-doped or antimony-doped indium oxide, antimony-doped tin oxide can be preferably used as the material of the conductive thin metal film. The following methods can be utilized to form the conductive thin metal film (ITO film) on the lower surface of the ultraviolet ray-permeable transparent plate 65: Vapor deposition method (for example, vacuum vapor deposition), sputtering method, vacuum film forming method such as ion plating method, hydrolysis reaction, chemical vapor deposition method (CVD method) such as thermal decomposition reaction or dipping method.

The heat-generating electrodes 10a and 10b consist of a highly conductive thin coat made of metal such as copper or silver bonded to the predetermined region of the lower surface of the ultraviolet ray-permeable transparent plate 65 or consist of a highly conductive thin coat made of metal such as copper or silver deposited in a thin layer on the predetermined position of the lower surface of the ultraviolet ray-permeable transparent plate 65 by vapor deposition method (for example, vacuum vapor deposition), sputtering method, vacuum film forming method such as ion plating method, hydrolysis reaction, chemical vapor deposition method (CVD method) such as thermal decomposition reaction or dipping method. Conductive wires 12a and 12b are connected with the heat-generating electrodes 10a and 10b, respectively. The conductive wires 12a and 12b and the temperature sensor 14 are electrically connected with a temperature controller which will be described later, when the transparent heating instrument 60 is used.

The transparent heat-generating conductive thin coat-unformed portion 7a is formed at the region at which a magnification lens of a microscope is positioned when the transparent heating instrument 60 is used. That is, the transparent heat-generating conductive thin coat-unformed portion 7a is formed at the center of the ultraviolet ray-permeable transparent plate 65. This construction prevents the absorption and dispersion of ultraviolet ray which will occur due to the presence of the transparent conductive thin coat 7 when a fluorescent microscope is used. The transparent heat-generating conductive thin coat-unformed portion 7a can be formed by forming the transparent heat-generating conductive thin coat with the region corresponding thereto masked or after the transparent heat-generating conductive thin coat is formed on the lower surface of the ultraviolet ray-permeable transparent plate 65 entirely, including the region thereof corresponding to the transparent heat-generating conductive thin coat-unformed portion 7a, the region thereof corresponding to the transparent heat-generating conductive thin coat-unformed portion 7a is removed by a mechanical or chemical method. The former method is more favorable than the latter method.

The ultraviolet ray-permeable transparent plate 65 has a region, in the entire periphery thereof, in which the transparent heat-generating conductive thin coat 7 is not formed. The heat-generating electrodes 10a and 10b are also positioned inward at predetermined intervals from the periphery of the ultraviolet ray-permeable transparent plate 65. That is, there is formed a region, along the entire periphery of the ultraviolet ray-permeable transparent plate 65, in which the heat-generating electrodes 10a and 10b and the transparent heat-generating conductive thin coat 7 are not formed. This construction prevents electromagnetic waves generated by the heat-generating electrodes 10a and 10b and the transparent heat-generating conductive thin coat 7 from traveling above the ultraviolet ray-permeable transparent plate 65. That is, the construction prevents the electromagnetic waves generated by the heat-generating electrodes 10a and 10b and the transparent heat-generating conductive thin coat 7 from adversely affecting a to-be-examined object placed on the ultraviolet ray-permeable transparent plate 65. The radial distance between the periphery of the ultraviolet ray-permeable transparent plate 65 and the periphery of the heat-generating electrodes 10a and 10b as well as the transparent heat-generating conductive thin coat 7 is favorably 0.5–10 mm and more favorably 1–5 mm.

The transparent thin hard coat 8 coating the entire transparent heat-generating conductive thin coat 7 is formed on the lower surface the ultraviolet ray-permeable transparent plate 65. The transparent thin hard coat 8 is made of a material substantially insulating. In the embodiment, the transparent thin hard coat 8 coats the entire heat-generating electrodes 10a and 10b and the ire periphery, of the ultraviolet ray-permeable transparent plate 65, in which the transparent heat-generating conductive thin coat 7 is not formed.

The same materials as those of the transparent thin hard coat 8 of the transparent heating instrument 1 can be preferably used to form the transparent thin hard coat 8 of the embodiment. It is favorable that the transparent thin hard coat is formed of zirconium oxide ($ZrO_2$), alumina ($Al_2O_3$), silicon oxide ($SiO_2$), titanium carbide or a composite conning two or more of these substances as a main component. It is more favorable that the transparent thin hard coat consists of zirconium oxide ($ZrO_2$), alumina ($Al_2O_3$) or silicon oxide ($SiO_2$).

The transparent thin hard coat may be formed of silicon hard coating agent cured on the surface of the ultraviolet ray-permeable transparent plate 65. The cured silicon hard coating agent is formed of a crosslinked material which is formed as a result of reaction of silanol groups of condensate resulting from hydrolysis of organoalkoxysilane when the condensate is heated. The resulting transparent thin hard coat comprises silicon oxide ($SiO_2$) and organic groups (alkyl group, for example, methyl group, ethyl group) connected with a part of the network structure of the silicon oxide ($SiO_2$). The transparent thin hard coat 8 protects the lower surface of the ultraviolet ray-permeable transparent plate 65 from being damaged easily and allows the transparent heat-generating plate 62 to have a sufficient degree of strength although it is as thin as less than 1 mm.

In order to form the transparent thin hard coat 8, a material selected from the above-described materials is deposited on the lower surface of the transparent plate 5 by vapor deposition (for example, vacuum vapor deposition), sputtering method, vacuum film forming method such as ion plating method, hydrolysis reaction, chemical vapor deposition method (CVD method) such as thermal decomposition reaction, dipping method or coating method (for example, spray method, rolling method, spinner method). Then, the deposited material is cured by heating method, plasma method or left at the room temperature. It is preferable that the transparent thin hard coat 8 has a thickness in the range of 0.01–100 μm.

In the embodiment, the transparent thin hard coat 8 is so formed that it does not cover the transparent heat-generating conductive thin coat-unformed portion 7a of the ultraviolet ray-permeable transparent plate 65. The construction prevents absorption and dispersion of ultraviolet rays which will occur due to the presence of the transparent thin hard coat.

When the transparent thin hard coat 8 is formed of a material having a high degree of ultraviolet ray-permeability, namely, a transparent thin hard coat permeable to ultraviolet ray, as shown in FIG. 8, the transparent heat-generating conductive thin coat-unformed portion 7a of the ultraviolet ray-permeable transparent plate 65 may be coated with the transparent thin hard coat 8 to prevent physical property of the transparent heating plate from being deteriorated at its center. The transparent thin hard coat permeable to ultraviolet ray can be formed of silicon oxide ($SiO_2$).

As shown in FIGS. 6 and 7, the housing 3 has an opening formed in the center part thereof, a transparent heat-generating plate-placing portion so formed that it surrounds the opening; and an opening portion 18 through which a connection cord connected with the heat-generating electrodes 10a and 10b and the temperature sensor 14 passes.

The temperature sensor 14 is so provided that it contacts the lower surface of the transparent heat-generating plate 62. The temperature sensor 14 may be provided inside the transparent heat-generating plate 62 or on the upper surface thereof. Any sensors capable of detecting temperature can be used as the temperature sensor 14. A thermocouple, a thermistor or the like can be preferably used as the temperature sensor 14.

The conductive cords 12a and 12b connected with the heat-generating electrodes 10a and 10b, respectively and the signal conductor connected with the temperature sensor 14 are bundled as a cord 16 extending to the outside from the opening portion 18 of the housing 3. A connector 25 is installed at one end of the cord 16, thus forming a connection terminal which is connected with the temperature controller 31 which has been described previously.

In the transparent heating instrument 60 of the embodiment, the housing 3 has the opening portion for taking out the conductive cords 12a and 12b from the housing 3, as described above. The transparent heating instrument 60 has a deformable member 20 capable of holding the conductive cords 12a and 12b taken out from the opening portion 18 to the outside in a desired shape. More specifically, a tube 19 whose one end thereof is positioned inside the opening portion 18 extends outward. The cord 16 containing the conductive cords 12a and 12b extends through the inside of the tube 19. The tube 19 accommodates the metal cord 20 (for example, wire) whose one end is fixed to the inside of the opening portion 18 of the housing 3 or is provided with a locking portion 20a serving as a means for preventing the metal cord 20 parallel with the cord 16 from being removed from the housing 3. As the metal cord 20, a wire so plastically deformable as to be bent by hands is used.

The other constructions of the transparent heating instrument 60 of the embodiment are the same as those of the transparent heating instrument 1 described above.

The transparent heating instrument 60 is used by incorporating it in the stage of a microscope. A temperature control device comprises the transparent heating instrument 60 and the above-described temperature controller 31.

A transparent heating instrument 90, of an embodiment, for use in a microscope (hereinafter referred to as merely transparent heating instrument 90) will be described below with reference to FIG. 9.

The construction of the transparent heating instrument 90 of the embodiment is essentially the same as that of the transparent heating instrument 60 shown in FIGS. 6 and 7 except the construction of a transparent heat-generating plate 92.

In the transparent heat-generating plate 92, an ultraviolet ray-permeable transparent plate 65 has a heat-ungenerating transparent conductive thin coat 9 formed on a surface (upper surface on which transparent heat-generating conductive thin coat 7 is not formed) thereof; a transparent heat-ungenerating conductive thin coat-unformed portion 9a which is formed in a region of the surface (upper surface) of the ultraviolet ray-permeable transparent plate 65 on which the heat-ungenerating transparent conductive thin coat 9 is formed such that the region of the transparent heat-ungenerating conductive thin coat-unformed portion 9a corresponds to the region of the transparent heat-generating conductive thin coat-unformed portion 7a; a ground cord 19 in contact with the heat-ungenerating transparent conductive thin coat 9, and a second transparent thin hard coat 11 covering the heat-ungenerating transparent conductive thin coat 9 and substantially insulating.

The heat-ungenerating transparent conductive thin coat 9 covers the entire upper surface of the ultraviolet ray-permeable transparent plate 65 except the center part thereof. The heat-ungenerating transparent conductive thin coat 9 may be formed of the same material as that of the transparent heat-generating conductive thin coat 7 shown in FIGS. 1 through 3. Because the heat-ungenerating transparent conductive thin coat 9 is not required to generate heat when it is electrified, it may be formed of a material having a resistance lower than that of the transparent heat-generating conductive thin coat 7.

The heat-ungenerating transparent conductive thin coat 9 can be preferably formed of the following materials: Gold, copper, tin oxide, $SiO_2$-indium alloy, indium oxide, tin-doped indium oxide or antimony-doped indium lo oxide, antimony-doped tin oxide. The following methods can be utilized to form the conductive metal film (ITO film) on the upper surface of the ultraviolet ray-permeable transparent plate 65: Vapor deposition method (for example, vacuum vapor deposition), sputtering, vacuum film forming method such as ion plating method, hydrolysis reaction, chemical vapor deposition method (CVD method) such as thermal decomposition reaction or dipping.

The transparent heat-ungenerating conductive thin coat-unformed portion 9a is formed at the position at which a magnification lens of a microscope is positioned when the transparent heating instrument 90 is used.

That is, the transparent heat-ungenerating conductive thin coat-unformed portion 9a is formed in the region (center), of the upper surface of the ultraviolet ray-permeable transparent plate 65, corresponding to the region of the transparent heat-generating conductive thin coat-unformed portion 7a. This construction prevents the absorption and dispersion of ultraviolet ray which will occur due to the presence of the transparent conductive thin coat when a fluorescent microscope is used. The transparent heat-ungenerating conductive thin coat-unformed portion 9a can be formed by forming the transparent heat-generating conductive thin coat, with the region corresponding thereto masked or after the transparent heat-generating conductive thin coat is formed on the lower surface of the ultraviolet ray-permeable transparent plate 65 entirely, including the region thereof corresponding to the transparent heat-ungenerating conductive thin coat-unformed portion 9a, the region thereof corresponding to the transparent heat-ungenerating conductive thin coat-unformed portion 9a is removed by a mechanical or chemical method. The former method is more favorable than the latter method.

The ground cord 19 is connected with the heat-ungenerating transparent conductive thin coat 9. Electromagnetic waves which have collided with the upper surface of the ultraviolet ray-permeable transparent plate 65 and reached the heat-ungenerating transparent conductive thin coat 9 flow through the ground cord 19, thus disappearing.

The second transparent thin hard coat 11 covering the heat-ungenerating transparent conductive thin coat 9 is formed on the upper surface of the ultraviolet ray-permeable transparent plate 65. As the material of the second transparent thin hard coat 11, the same materials as those of the transparent thin hard coat 8 of the transparent heating instrument 1 or the transparent heating instrument 60 can be preferably used. As the transparent thin hard coat, the following materials can be favorably used: Zirconium oxide ($ZrO_2$), alumina ($Al_2O_3$), silicon oxide ($SiO_2$), titanium carbide or a composite containing two or more of these substances as a main component. It is more favorable that the transparent thin hard coat consists of zirconium oxide ($ZrO_2$) film, alumina ($Al_2O_3$) film or silicon oxide ($SiO_2$) film.

The transparent thin hard coat may be formed of silicon hard coating agent cured on the surface of the transparent plate 65. The cured silicon hard coating agent is formed of a crosslinked material which is formed as a result of reaction of silanol groups of condensate resulting from hydrolysis of organoalkoxysilane when the condensate is heated. The resulting transparent thin hard coat comprises silicon oxide ($SiO_2$) and organic groups (alkyl group, for example, methyl group, ethyl group) connected with a part of the stitch structure of the silicon oxide ($SiO_2$).

In order to form the second transparent thin hard coat 11, a material selected from the above-described materials is deposited on the lower surface of the transparent plate 5 by vapor deposition (for example, vacuum vapor deposition), sputtering method, vacuum film forming method such as ion plating method, hydrolysis reaction, chemical vapor deposition method (CVD method) such as thermal decomposition reaction, dipping method or coating method (for example, spray method, rolling method, spinner method). Then, the deposited material is cured by heating method, plasma method or left at the room temperature. It is preferable that the transparent thin hard coat 11 has a thickness in the range of 0.01–100 μm.

The material of the transparent thin hard coat 8 may be different from that of the second transparent thin hard coat 11. For example, the transparent thin hard coat 8 may be formed of any one of $SiO_2$, $ZrO_2$, and $Al_2O_3$, and the second transparent thin hard coat 11 may be formed of materials other those which are used to form the transparent thin hard coat 8 and may be formed of the silicon hard coating agent. It is preferable that the second transparent thin hard coat 11 has a thickness in the range of 0.01–100 μm.

The thickness of the transparent heat-generating plate 92 is not increased much even though the second transparent thin hard coat 11 is formed on the ultraviolet ray-permeable transparent plate 65. The second-transparent thin hard coat 11 protects the upper and lower surfaces of the ultraviolet ray-permeable transparent plate 65 from being damaged easily and allows the transparent heat-generating plate 92 to have a high strength. The thickness of the transparent heat-generating plate 92 of the transparent heating instrument 90 is favorably less than 1 mm and more favorably, in the range of 0.2–0.6 mm. It is possible to use the ultraviolet ray-permeable transparent plate 65 having a thickness smaller than that of the ultraviolet ray-permeable transparent plate 65 of the transparent heating instrument 60 in the case where the transparent thin hard coat is formed on the upper surface of the ultraviolet ray-permeable transparent plate 65 in addition to the transparent thin hard coat 8 which is formed on the lower surface thereof.

In the embodiment, the second transparent thin hard coat 11 is so formed that it does not cover the transparent heat-ungenerating conductive thin coat-unformed portion 9a of the ultraviolet ray-permeable transparent plate 65. The construction prevents absorption and dispersion of ultraviolet rays which will occur due to the presence of the transparent thin hard coat.

When the transparent thin hard coat 8 and the second transparent thin hard coat 11 are formed of a material having a high degree of ultraviolet ray-permeability, namely, a transparent thin hard coat permeable to ultraviolet ray, as shown in FIG. 10, the transparent heat-generating conductive thin coat-unformed portion 7a of the ultraviolet ray-permeable transparent plate 63 may be coated with the transparent thin hard coat 8, and the transparent heat-ungenerating conductive thin coat-unformed portion 9a thereof may be coated with the second transparent thin hard coat 11 to prevent physical property of the transparent heating plate from being deteriorated at its center. The transparent thin hard coat permeable to ultraviolet ray can be formed of silicon oxide ($SiO_2$).

The other constructions of the transparent heating instrument 90 of the embodiment are the same as those of the transparent heating instrument 60 described above.

The transparent heating instruments of the embodiments described above are used for a microscope but can be used for a transparent heating instrument for examining an object with the naked eye without changing the construction thereof. The transparent heating instrument for examining an object with the naked eye is used to examine cells of animals and plants, microorganisms (bacterium, yeast, mold), glass transition point, softening point or melting point of resin, and the like.

A transparent heating instrument, of an embodiment, for use in a microscope (hereinafter referred to as merely transparent heating instrument) will be described below with reference to FIG. 12 through 14.

Figure 12:
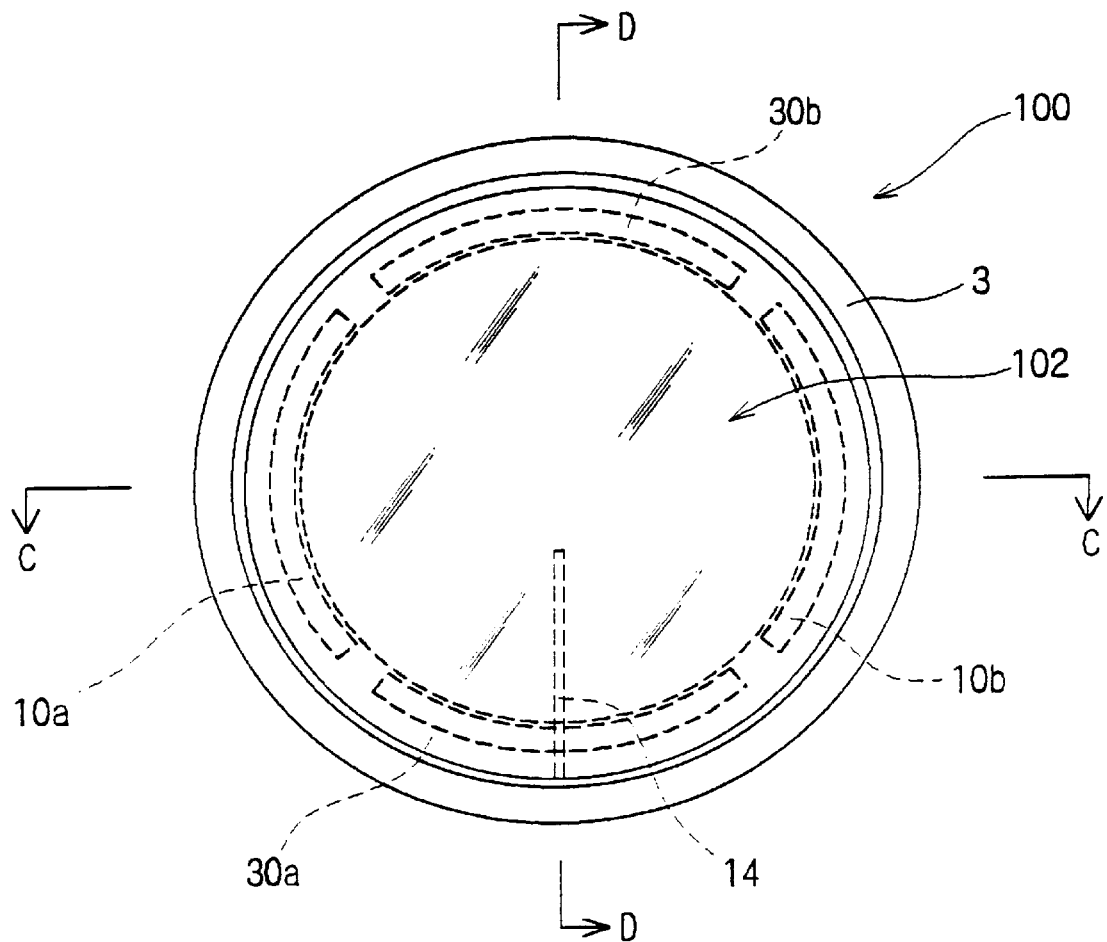
FIG. 12 is a plan view showing a transparent heating instrument, for use in a microscope, according to another embodiment of the present invention.

FIG. 12 is a plan view showing a transparent heating instrument, for use in a microscope, according to an embodiment of the present invention. FIG. 13 is a sectional view taken along a line C—C of FIG. 12 FIG. 14 is a sectional view taken along a line D—D of FIG. 12. FIG. 15 is a sectional view showing a transparent heating instrument, for use in a microscope, according to an embodiment of the present invention.

Figure 13:
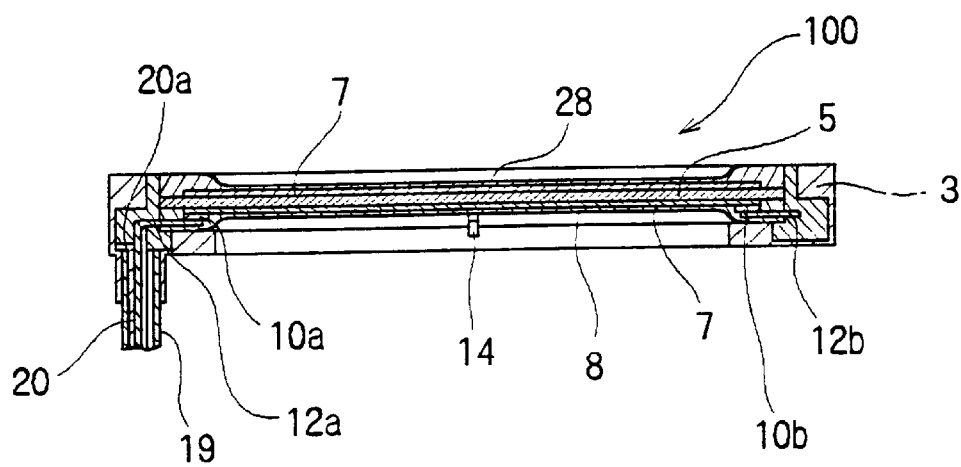
FIG. 13 is a sectional view taken along a line C—C of FIG. 12.

As shown in FIGS. 12 and 13, a transparent heating instrument 100 of the embodiment comprises a transparent heat-generating plate 102 and an annular housing 3 accommodating the transparent heat-generating plate 102. A housing 3 holds the periphery of the transparent heat-generating plate 102.

Figure 14:
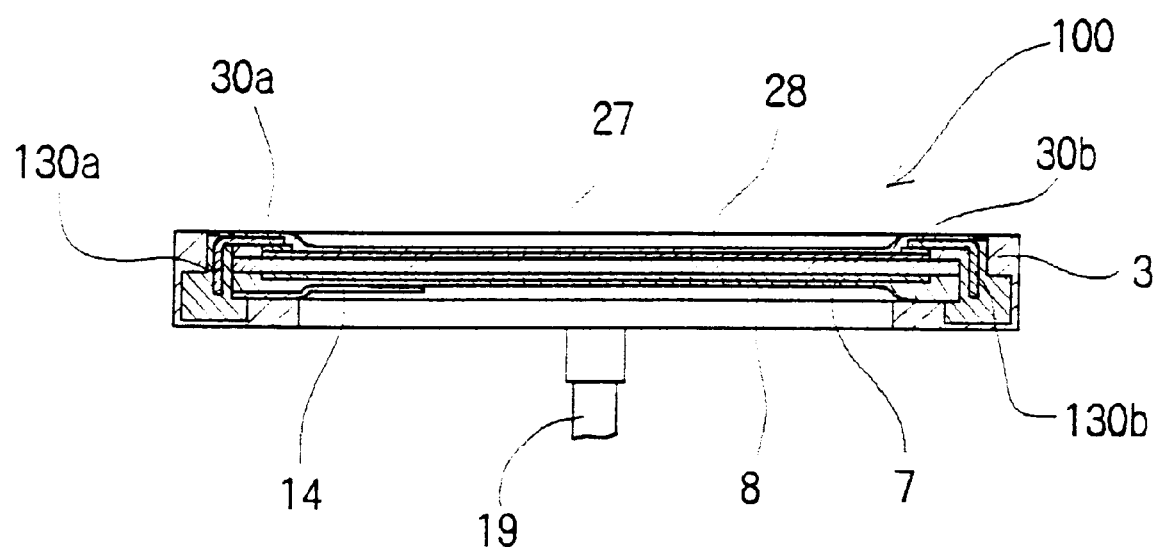
FIG. 14 is a sectional view taken along a line D—D of FIG. 12.
Figure 15:
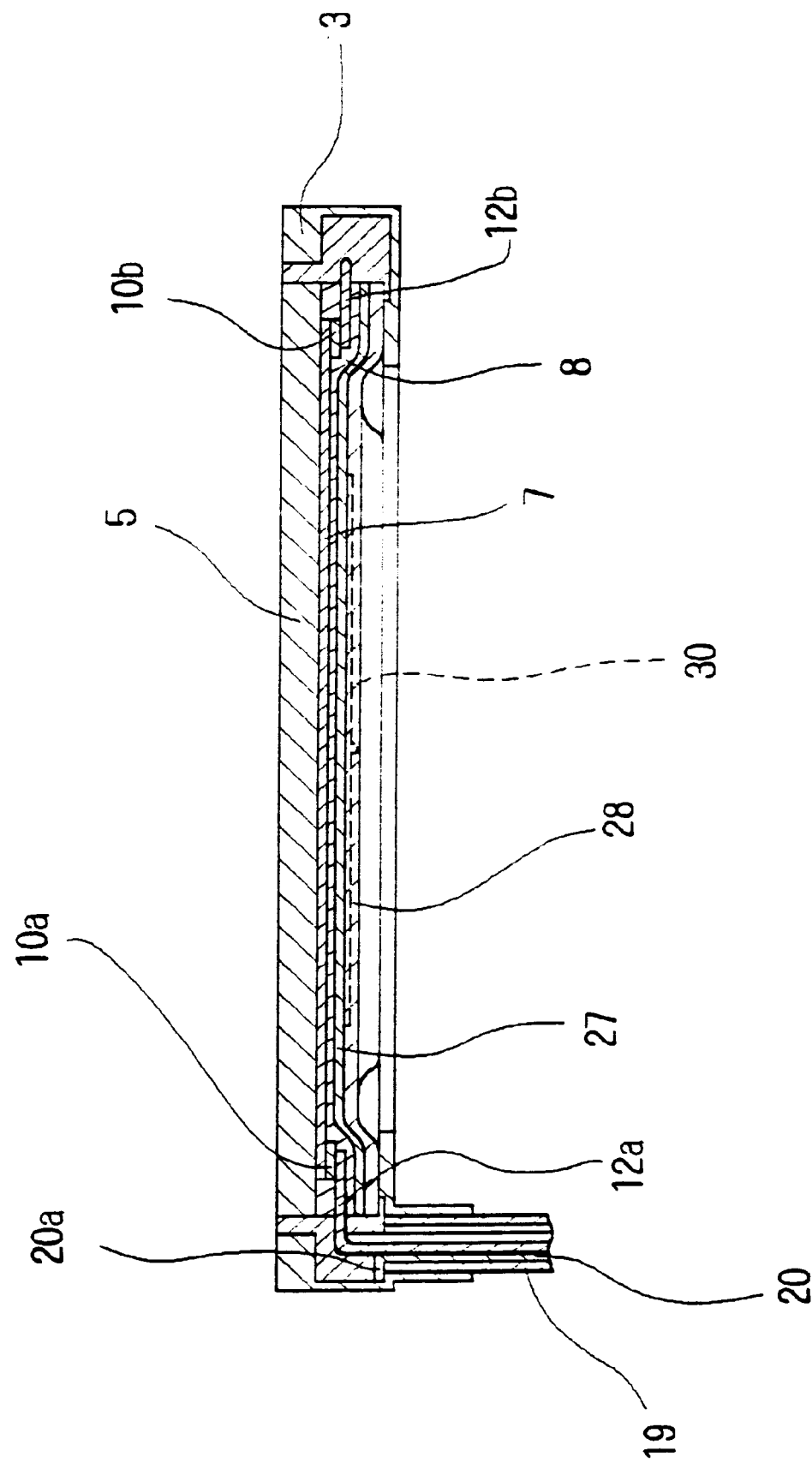
FIG. 15 is a sectional view showing a transparent heating instrument, for use in a microscope, according to another embodiment of the present invention.

As shown in FIGS. 12 and 14, the transparent heat-generating plate 102 of the embodiment comprises a transparent plate 5; a first transparent heat-generating conductive thin coat 7 formed on one surface (lower surface) of the transparent plate 5; a pair of heat-generating electrodes 10a and 10b in contact with the first transparent heat-generating conductive thin coat 7 and opposed to each other; a first transparent thin hard coat 8 covering the first transparent heat-generating conductive thin coat 7 and substantially insulating; a second transparent heat-generating conductive thin coat 27 formed on the other surface (upper surface) of the transparent plate 5; a pair of second heat-generating electrodes 30a and 30b in contact with the second transparent heat-generating conductive thin coat 27 and opposed to each other; and a second transparent thin hard coat 28 covering the second transparent heat-generating conductive thin coat 27 and substantially insulating.

This construction allows the center of the transparent heating plate which is used to examine an object and a region proximate thereto to be heated at a substantially uniform temperature irrespective of whether the transparent heating plate is circular, even though the center of the transparent heating plate is a region in which the transparent heat-generating conductive thin coat-unformed portion is formed or even though a through-hole is formed at the center of the transparent plate 5.

The mode of the transparent heat-generating plate 102 is not limited to the above-described one. For example, as shown in FIG. 15, the transparent heat-generating plate 102 of the transparent heating instrument 100 of the embodiment may comprise the transparent plate 5; the first transparent heat-generating conductive thin coat 7 formed on one surface (lower surface) of the transparent plate 5; a pair of the heat-generating electrodes 10a and 10b in contact with the first transparent heat-generating conductive thin coat 7 and opposed to each other; the first transparent thin hard coat 8 covering the first transparent heat-generating conductive thin coat 7 and substantially insulating; the second transparent heat-generating conductive thin coat 27 covering the first transparent thin hard coat 8 of the transparent plate 5; a pair of the second heat-generating electrodes 30a and 30b in contact with the second transparent heat-generating conductive thin coat 27 and opposed to each other; and the second transparent thin hard coat 28 covering the second transparent heat-generating conductive thin coat 27 and substantially insulating.

The construction of the transparent heating instrument 100 of the embodiment is essentially the same as that of the transparent heating instrument 1 shown in FIGS. 1 through 3 except that the transparent heating instrument 100 has the second transparent heat-generating conductive thin coat 27 formed on the upper surface of the transparent plate 5; a pair of the second heat-generating electrodes 30a and 30b in contact with the second transparent heat-generating conductive thin coat 27 and opposed to each other; and the second transparent thin hard coat 28 covering the second transparent heat-generating conductive thin coat 27 and substantially insulating. The same parts of the embodiment as those of the above-described embodiments are denoted by the same reference numerals and letters as those of the above-described embodiments. Thus, the description of the same parts as those of the above-described embodiments are omitted herein.

The transparent heating instrument 100 has the temperature sensor 14 fixed to the lower surface of the transparent heat-generating plate 102.

As shown in FIG. 12, a pair of the second heat-generating electrodes 30a and 30b opposed to each other is so formed that the center line thereof is substantially perpendicular to the center line of the heat-generating electrodes 10a and 10b opposed to each other.

In the embodiment, the transparent plate 5 is circular. The first transparent heat-generating conductive thin coat 7 is formed on the entire lower surface of the transparent plate 5 except the periphery thereof. The transparent plate 5 has a pair of the heat-generating electrodes 10a and 10b which are opposed to each other, circular arc-shaped in correspondence to the shape thereof, and each of which has a length a little shorter than about ¼ of the circumference of the transparent plate 5. The transparent plate 5 has a region, along its periphery, in which the opposed heat-generating electrodes 10a and 10b having the length about ¼ of the circumference of the transparent plate 5 are not formed. The temperature sensor 14 is installed on the transparent plate 5 at a position thereof corresponding to the region in which the heat-generating a electrodes 10a and 10b are not formed. The first transparent heat-generating conductive thin coat 7 is also formed on the entire upper surface of the transparent plate 5 except the periphery of the upper surface thereof. There is formed on the transparent plate 5 a pair of the second heat-generating electrodes 30a and 30b which are opposed to each other, circular arc-shaped in correspondence to the shape thereof and each of which has a length a little shorter than about ¼ of the circumference of the transparent plate 5. The transparent plate 5 has a region, along its periphery, in which the opposed second heat-generating electrodes 30a and 30b having the length about ¼ of the circumference of the transparent plate 5 are not formed.

As shown in FIG. 12, the heat-generating electrodes 10a and 10b and the second heat-generating electrodes 30a and 30b are so formed on the transparent plate 5 that they do not overlap with each other substantially and that the center line of the heat-generating electrodes 10a and 10b is substantially perpendicular to the center line of the second heat-generating electrodes 30a and 30b at approximately the center of the transparent heat-generating plate 102. "Substantially perpendicular" includes the case in which both center lines intersect with each other at an angle of 80–110°.

The shape of the transparent plate 5 is not limited to a circle. The circularity includes a true circle, an ellipse, and an elongated circle. The transparent plate 5 may be polygonal, e.g., quadrangular, hexagonal or the like. It is preferable that the heat-generating electrodes 10a, 10b, 30a, and 30b have the same size. But the electrodes 10a and 10b formed on the lower surface of the transparent plate 5 may be greater (for example, ⅓ of the circumference of the transparent plate 5) than ¼ of the circumference of the transparent plate 5. In addition, the second heat-generating electrodes 30a and 30b may be smaller (for example, ⅙ of the circumference of the transparent plate 5) than ¼ of the circumference of the transparent plate 5. The entire periphery of the transparent heat-generating plate 102 may not be surrounded with the heat-generating electrodes 10a and 10b and the second heat-generating electrodes 30a and 30b. For example, it is possible to form both the heat-generating electrodes 10a and 10b and the second heat-generating electrodes 30a and 30b on the lower surface of the transparent plate 5 in a size about ⅕ of the circumference of the transparent plate 5 such that the center line of the heat-generating electrodes 10a and 10b is substantially perpendicular to the center line of the second heat-generating electrodes 30a and 30b. In this case, a part of the peripheral region of the transparent heat-generating plate 102 is not heated, but the center region thereof is preferably heated. Because the heat-generating electrodes 10a and 10b are not conductive with the second heat-generating electrodes 30a and 30b, they call be so positioned that end parts thereof overlap with each other. Further, the shape of the heat-generating electrodes 10a and 10b and that of the second heat-generating electrodes 30a and 30b are not limited to a circular-arc. For example, they may be linear, as shown in FIG. 16. In this case, because the heat-generating electrodes 10a and 10b are not conductive with the second heat-generating electrodes 30a and 30b, they can be so positioned that end parts thereof overlap with each other or do not overlap with each other.

The transparent plate 5 has a region, in the entire periphery, in which the first transparent heat-generating conductive thin coat 7 and the second transparent heat-generating conductive thin coat 27 are not formed. The heat-generating electrodes 10a and 10b and the second heat-generating electrodes 30a and 30b are positioned inward at predetermined intervals from the periphery of the transparent heat-generating plate 102. That is, there is formed a region, along the periphery of the transparent plate 5, in which the heat-generating electrodes 10a and 10b, the second heat-generating electrodes 30a and 30b, the first transparent heat-generating conductive thin coat 7, and the second transparent heat-generating conductive thin coat 27 are not formed. This construction prevents electromagnetic waves generated thereby from traveling above the transparent plate 5. That is, the construction prevents the electromagnetic waves generated thereby from adversely affecting a to-be-examined object placed on the transparent plate 5. The radial distance between the periphery of the transparent plate 5 and the periphery of the heat-generating electrodes 10a and 10b, that of the first transparent heat-generating conductive thin coat 7, and that of the second transparent heat-generating conductive thin coat 27 is favorably 0.5–10 mm and more favorably 1–5 mm.

The transparent plate 5 has the first transparent thin hard coat 8 coating the entire first transparent heat-generating conductive thin coat 7 formed on the lower surface the transparent plate 5. The transparent plate 5 also has the second transparent thin hard coat 28 covering the entire second transparent heat-generating conductive thin coat 27 formed on the upper surface thereof. The first transparent thin hard coat 8 and the second transparent thin hard coat 28 are formed of a material, respectively substantially insulating. In the embodiment, the first transparent thin hard coat 8 coats the entire heat-generating electrodes 10a and 10b and the periphery, of the transparent plate 5, in which the second transparent heat-generating conductive thin coat 7 is not formed. The cured first transparent thin hard coat 8 protects the lower surface of the transparent plate 5 from being damaged easily and promptly. Similarly, in the embodiment, the second transparent thin hard coat 28 coats the entire second heat-generating electrodes 30a and 30b and the periphery, of the transparent plate 5, in which the second transparent heat-generating conductive thin coat 27 is not formed. The second transparent thin hard coat 28 protects the upper surface of the transparent plate 5 from being damaged easily and promptly. Because the transparent heat-generating plate 102 has the cured first transparent thin hard coat 8 and the second transparent thin hard coat 28 formed thereon, it has a high strength although it is as thin as less than 1 mm. The above-described transparent thin hard coat can be preferably used as the transparent thin hard coat.

There may be formed a region (transparent heat-generating conductive thin coat-unformed portion), in the center (center of the transparent heat-generating plate 102) of the transparent plate 5, in which the first transparent heat-generating conductive thin coat 7 and the second transparent heat-generating conductive thin coat 27 are not formed, by using an ultraviolet ray-permeable transparent plate, similarly to the embodiments described previously with reference to FIGS. 6 through 10.

In this case, as described previously, it is preferable not to form the transparent thin hard coat (in particular, transparent thin hard coat) on the transparent heat-generating conductive thin coat-unformed portion or form the transparent thin hard coat (in particular, transparent thin hard coat) of an ultraviolet ray-permeable material.

The transparent plate, the transparent heat-generating conductive thin coat, the heat-generating electrode, and the transparent thin hard coat (transparent thin hard coat), the housing, and the sensor of the embodiment are the same as those of the embodiments previously described.

A transparent heating instrument for use in a microscope (hereinafter referred to as merely transparent heating instrument) of the embodiment will be described below with reference to FIGS. 17 and 18.

Figure 17:
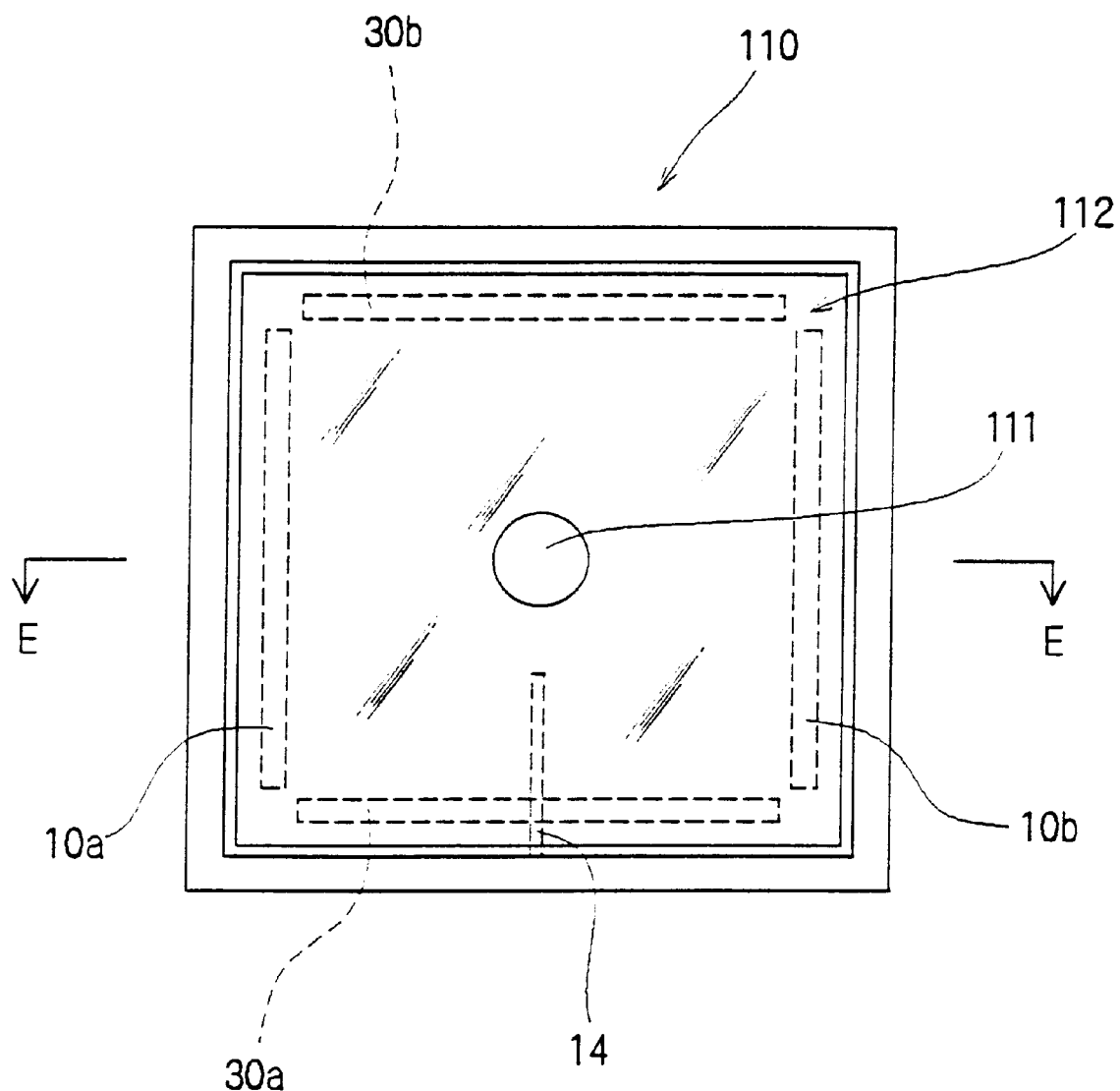
FIG. 17 is a plan view showing a transparent heating instrument, for use in a microscope, according to another embodiment of the present invention.
Figure 18:
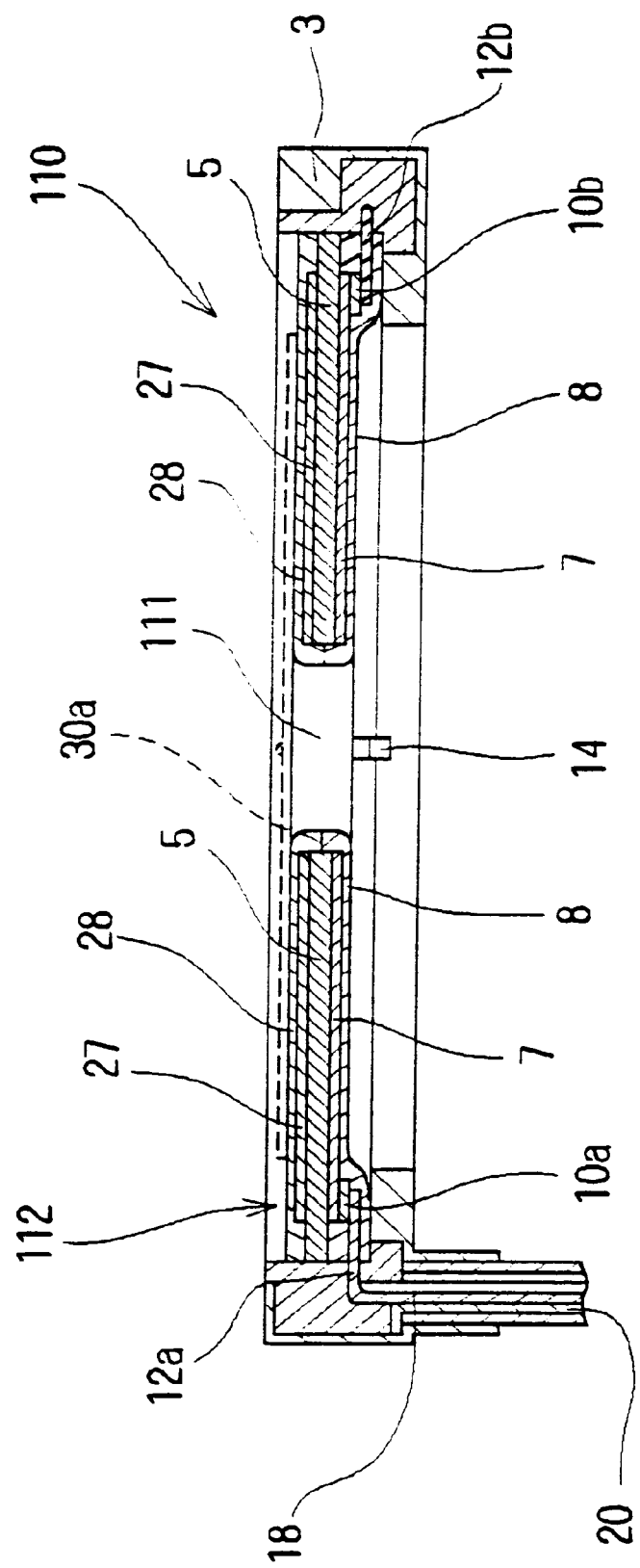
FIG. 18 is a sectional view taken along a line E—E of FIG. 17.

FIG. 17 is a plan view showing a transparent healing instrument, for use in a microscope, according to an embodiment of the present invention. FIG. 18 is a sectional view taken along a line E—E of FIG. 17. As shown in FIGS. 17 and 18, a transparent heating instrument 110 of the embodiment comprises a transparent heat-generating plate 112 and an annular housing 3 accommodating the transparent heat-generating plate 112.

The transparent heating instrument 110 is similar to the transparent heating instrument 100 described above with reference to FIGS. 12 through 14 except that the transparent heating instrument 110 is polygonal (for example, rectangular or square in particular) and has a circular through-hole 111 formed at the center thereof. The fundamental construction of the transparent heating instrument 110 is also similar to that of transparent heating instrument 1 previously described. Thus, the same parts of the transparent heating instrument 110 as those of the transparent heating instrument 1 are denoted by the same reference numerals and letters as those of the transparent heating instrument 1, and the descriptions thereof are omitted herein.

The transparent heat-generating plate 112 of the embodiment comprises a transparent plate 5; a first transparent heat-generating conductive thin coat 7 formed on one (lower) surface of the transparent plate 5; a pair of heat-generating electrodes 10a and 10b in contact with the first transparent heat-generating conductive thin coat 7 and opposed to each other; a second transparent heat-generating conductive thin coat 27; a pair of second heat-generating electrodes 30a and 30b in contact with the second transparent heat-generating conductive thin coat 27 and opposed to each other; and a second transparent thin hard coat 28 covering the second transparent heat-generating conductive thin coat 27 and substantially insulating. As shown in FIG. 17, the second heat-generating electrodes 30a and 30b opposed to each other are so formed that the center line thereof is substantially perpendicular to the center line of the heat-generating electrodes 10a and 10b opposed to each other.

As shown in FIG. 17, the heat-generating electrodes 10a and 10b and the second heat-generating electrodes 30a and 30b are so formed on the transparent plate 5 that they do not overlap with each other substantially and that the center line of the heat-generating electrodes 10a and 10b is substantially perpendicular to the center line of the second heat-generating electrodes 30a and 30b at approximately the center of the transparent heat-generating plate 102. "Substantially perpendicular" includes the case in which both center lines intersect with each other at an angle in the range of 80–110°.

Accordingly, the center of the transparent heating plate 112 and the region proximate thereto which are used to examine an object can be heated at a uniform temperature without being affected by the through-hole 111 formed at the center of the transparent heating plate 112.

The shape of the transparent plate 5 is not limited to a square. Tie transparent plate 5 may be rectangular. The diameter of the through-hole 111 formed at the center of the transparent plate 5 is preferably in the range of 5–30 mm. In the inner surface of the through-hole 111, the end surface (vertical direction) of the first transparent heat-generating conductive thin coat 7 and that of the second transparent heat-generating conductive thin coat 27 are covered with the cured first transparent thin hard coat 8 and the second transparent thin hard coat 28, respectively. The half (vertical direction) of the inner peripheral surface of the through-hole 111 of the transparent plate 5 is coated with the cured first transparent thin hard coat 8, and the remaining half of the inner peripheral surface thereof is covered with the second transparent thin hard coat 28. The cured first transparent thin hard coat 8 and the second transparent thin hard coat 28 are bonded to each other at the center (vertical direction) of the inner peripheral surface of the through-hole 111. Because the end surface of each of the transparent heat-generating conductive thin coats 7 and 27 is covered with each of the transparent thin hard coats 8 and 28, electromagnetic waves generated by the transparent heat-generating conductive thin coats 8 and 28 can be prevented from traveling above the transparent plate 5. Further, the first transparent thin hard coat 8 and the second transparent thin hard coat 28 reinforce the periphery of the through-hole 111 formed at the center of the transparent heating plate 112.

The transparent plate, the transparent heat-generating conductive thin coat, the heat-generating electrode, and the transparent thin hard coat (transparent thin hard coat), the housing, and the sensor of the embodiment are the same as those of the embodiments previously described.

A transparent heating instrument 120 for high temperature (hereinafter referred to as transparent heating instrument 120) of the present invention will be described below with reference to FIGS. 19 and 20.

Figure 19:
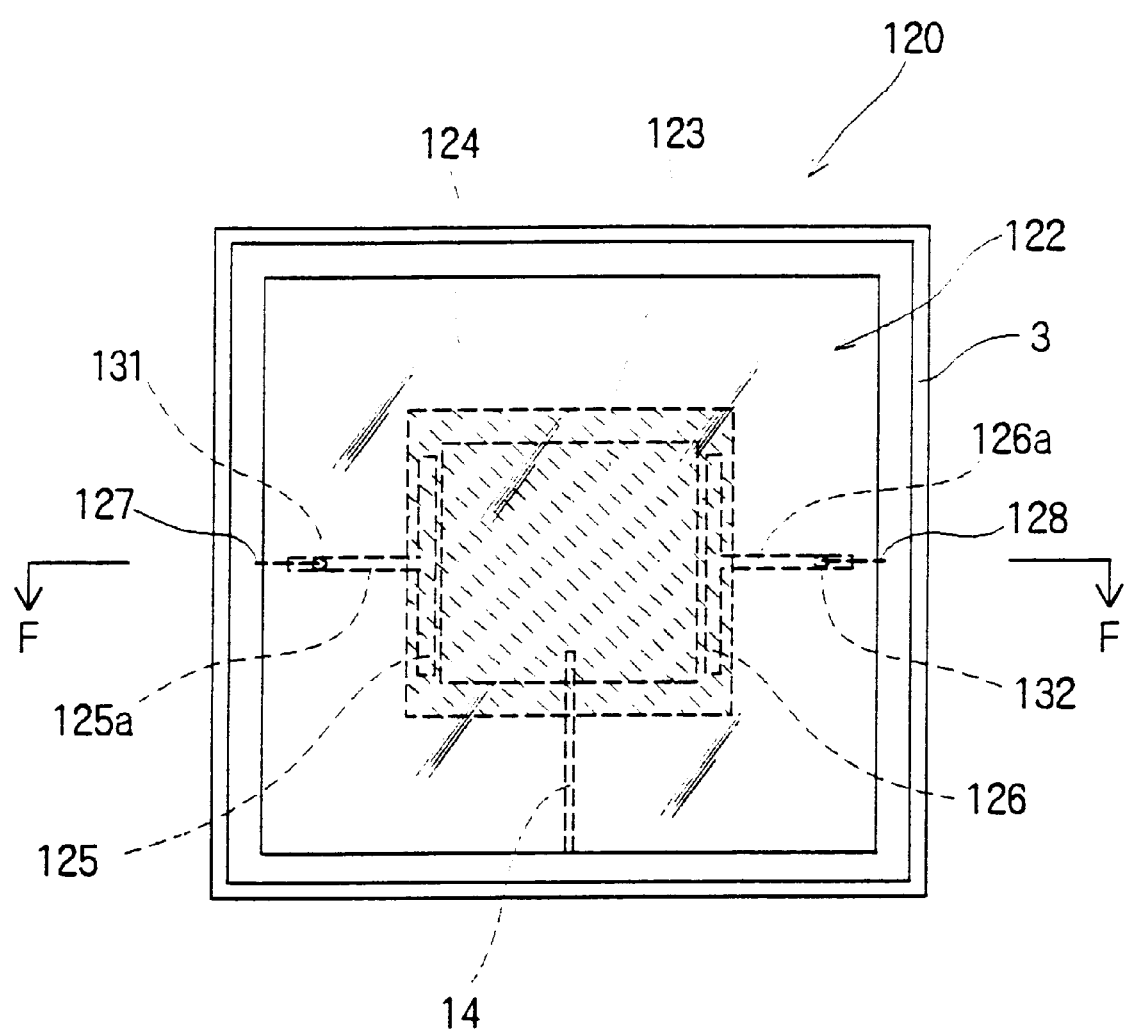
FIG. 19 is a plan view showing a transparent heating instrument, for high temperature, of the present invention.

FIG. 19 is a plan view showing a transparent heating instrument, for high temperature, of the present invention. FIG. 20 is a sectional view taken along a line F—F of FIG. 19.

The transparent heating instrument 120 for high temperature comprises a transparent heat-generating plate 122 having a heat-resistant transparent plate 5 (hereinafter referred to as merely transparent plate 5); a transparent heat-generating conductive thin coat 7 formed on one surface (lower surface) of the transparent plate 5; a pair of heat-generating electrodes 125 and 126 in contact with the transparent heat-generating conductive thin coat 7 and opposed to each other; and conductive cords 127 and 128 fixed to the heat-generating electrodes 125 and 126, respectively. The transparent heat-generating plate 122 has a heatable region 123 which can be heated by electrification and a unheatable region 124 which is not heated by electrification. One end of each of a pair of the heat-generating electrodes 125 and 126 is located in the heatable region 123, whereas an extended portion 125*a* and 126*a* of each thereof is located in the unheatable region 124. The conductive cords 127 and 128 are fixed to the extended portion 125*a* of the heat-generating electrode 125 and the extended portion 125*a* of the heat-generating electrode 126, respectively with adhesive agent.

Therefore, when the transparent heating instrument 120 is electrified to heat it, heat is not generated by the portion at which the conductive cord 127 and the heat-generating electrode 125 are fixed to each other and the portion at which the conductive cord 128 and the heat-generating electrode 126 are fixed to each other, but the fixed portions are heated by heat transfer. Thus, the fixed portions have a temperature lower than that of the heat-generating region, which prevents fusion of the conductive adhesive agent used to bond the conductive cords 127 and 128 to each other and the heat-generating electrodes 125 and 126 to each other.

The construction of the transparent heating instrument 120 of the embodiment is fundamentally the same as that of the transparent heating instrument 1 described previously except in the transparent heating instrument 120, the heat-resistant transparent plate 5 is used, the transparent heat-generating plate 122 has the unheatable region 124 which is not heated by electrification, and each of a pair of the heat-generating electrodes 125 and 126 is connected with the conductive cords 127 and 128, respectively in the unbeatable region 124 (at 125*a* and 126*a*).

The transparent heat-generating plate 122 of the transparent heating instrument 120 of the embodiment comprises the transparent heat-generating conductive thin coat-formed portion 123 and the transparent heat-generating conductive thin coat-unformed portion 124. The heatable region is formed of the transparent heat-generating conductive thin coat-formed portion 123 and the unheatable region is formed of the transparent heat-generating conductive thin coat-unformed portion 124.

The transparent heat-generating conductive thin coat 7 is formed at only the center of one surface (lower surface) of the transparent plate 5. The heat-generating electrodes 125 and 126 are formed in the periphery of the transparent heat-generating conductive thin coat 7. The heat-generating electrodes 125 and 126 extend into the transparent heat-generating conductive thin coat-unformed portion 124, thus having the extended portions 125*a* and 126*a*, respectively therein. The conductive cords 127 and 128 are fixed to a portion proximate to the end of each of the extended portions 125*a* and 126*a* with the conductive adhesive agent.

The mode of the transparent heating instrument 120 is not limited to the above-described one. For example, in the transparent heat-generating plate 122, the transparent heat-generating conductive thin coat 7 is formed entirely on one surface of the transparent plate 5; the heat-generating electrodes 125 and 126 are formed at positions proximate to the center; and the extended portions 125*a* and 126*a* are proximate to the periphery of the transparent heat-generating plate 122. That is, referring to FIG. 19, the transparent heat-generating conductive thin coat 7 may be formed entirely on one surface of the transparent plate 5 without changing the mode of the heat-generating electrodes 125 and 126. Even though the transparent heat-generating conductive thin coat 7 is formed entirely on one surface of the transparent plate 5, only the heatable region positioned between the heat-generating electrodes 125 and 126 opposed to each other is heated, and the end of each of the extended portions 125*a* and 126*a* positioned in the unheatable region is not heated.

A heat-resistant glass plate or a heat-resistant transparent resinous plate can be used as the transparent plate 5 which is heat-resistant and transparent. As the heat-resistant glass plate, a silica glass plate, high silicate glass plate, and borosilicate glass can be used. The thickness of the transparent plate 5 is preferably in the range of 0.3–5 mm.

The shape of the transparent plate 5 is not limited to a rectangle although the transparent plate 5 is drawn as a rectangle in FIG. 19. The transparent plate 5 may be polygonal, for example, hexagonal or the like.

The transparent heat-generating conductive thin coat 7 is formed of a conductive metal thin film. The conductive metal film which generates heat when they are electrified can be used as the material of the transparent heat-generating conductive thin coat 7. Tin oxide, $SiO_2$-indium alloy, indium oxide, tin-doped or antimony-doped indium oxide, antimony-doped tin oxide can be preferably used as the material of the conductive thin metal film. The following methods can be utilized to form the conductive thin metal film (ITO film) on the lower surface of the transparent plate 5: Vapor deposition method (for example, vacuum vapor deposition), sputtering method, vacuum film forming method such as ion plating method, hydrolysis reaction, chemical vapor deposition method (CVD method) such as thermal decomposition reaction or dipping method. It is favorable that the transparent healing instrument 120 can be heated at 80° C. or more. It is more favorable that the transparent heating instrument 120 can be heated at 100° C. or more. It is most favorable that the transparent heating instrument 120 can be heated at 200° C. or more. Thus, the transparent heat-generating conductive thin coat has a resistance higher than that of the transparent heating instrument 1 previously described. The transparent heat-generating conductive thin coat having such a high resistance (property of generating heat at a high temperature) can be formed of a conductive metal having a resistance; can be formed by adding additive to a material; or can be formed of a very thin conductive metal film.

The heat-generating electrodes 125 and 126 are formed of a highly conductive metal such as copper or silver which is bonded to the predetermined portion of the transparent plate 5 or formed of a highly conductive metal such as copper or silver which is deposited in a thin layer on a predetermined position of the transparent plate 5 by vapor deposition method (for example, vacuum vapor deposition), sputtering, vacuum film forming method such as ion plating method, hydrolysis reaction, chemical vapor deposition method (CVD method) such as thermal decomposition reaction or dipping. The conductive wires 127 and 128 are connected with the heat-generating electrodes 125 and 126, respectively. The conductive wires 127 and 128 and the temperature sensor 14 are electrically connected with a temperature controller 31 described previously, when the transparent heating instrument 120 is used.

The transparent thin hard coat 8 coating the entire transparent heat-generating conductive thin coat 7 is indispensably formed on the lower surface of the transparent plate 5. The transparent thin hard coat 8 is made of a material substantially insulating. In the embodiment, the transparent thin hard coat 8 coats the entire heat-generating electrodes 125 and 126 and the periphery, of the transparent plate 5, in which the transparent heat-generating conductive thin coat 7 is not formed. The transparent thin hard coat 8 protects the lower surface of the transparent plate 5 from being damaged easily and allows the transparent heat-generating plate 122 to have a sufficient degree of strength, although it is as thin as less than 1 mm.

A transparent thin hard coat and in particular, a heat-resistant transparent thin hard coat is used to form the transparent thin hard coat 8. It is favorable that the heat-resistant transparent thin hard coat is formed of any one zirconium oxide ($ZrO_2$), alumina ($Al_2O_3$), silicon oxide ($SiO_2$), titanium carbide or a composite containing two or more of these substances as a main component. It is more favorable that the transparent thin hard coat consists of any one of zirconium oxide ($ZrO_2$), alumina ($Al_2O_3$) or silicon oxide ($SiO_2$).

The transparent thin hard coat 8 can be formed by the following methods: For example, at 300° C., in argon atmosphere, at a vacuum degree of $5.0 \times 10^{-1}$ Pa, and by the application of high frequency wave-electric power of 500W, $SiO_2$, $ZiO_2$ or $Al_2O_3$ is formed by sputtering on a glass plate on which the transparent heat-generating conductive thin coat 7 has been formed.

Figure 20:
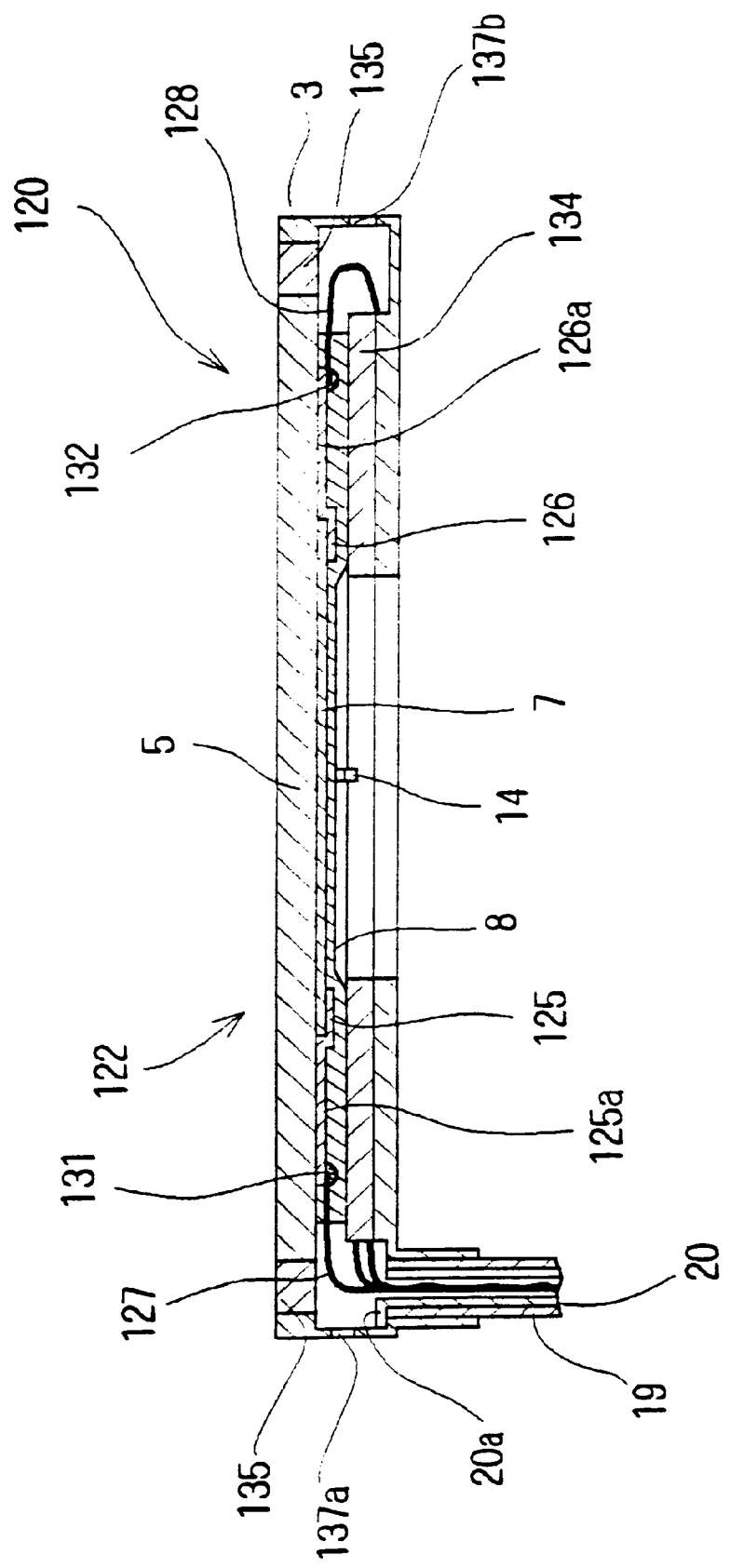
FIG. 20 is a sectional view taken along a line F—F of FIG. 19.
Figure 21:
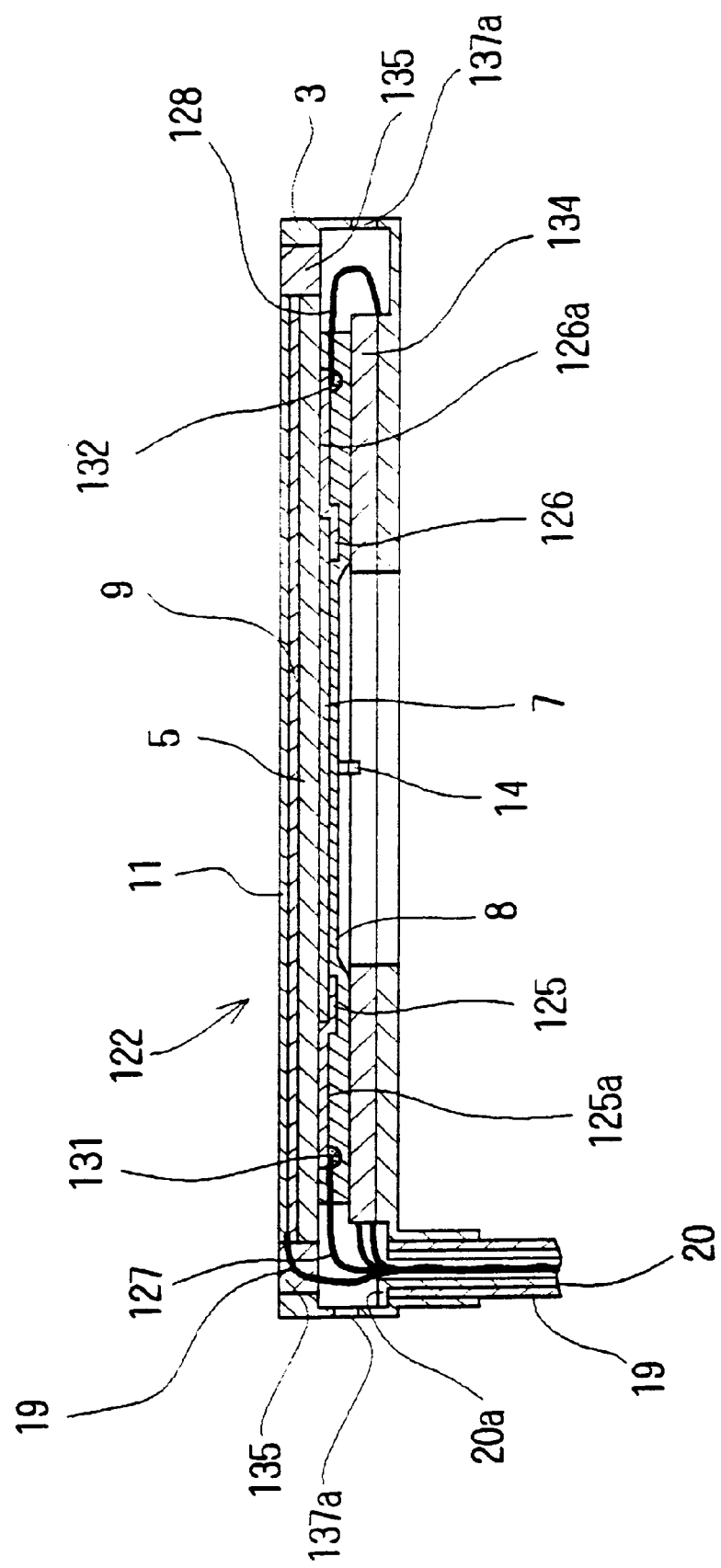
FIG. 21 is a sectional view showing the a transparent heating instrument, for high temperature, according to another embodiment of the present invention.

As shown in FIGS. 19 and 20, the housing 3 has an opening formed in the center part thereof; a transparent heat-generating plate-placing portion so formed that it surrounds the opening, and an opening portion 18 through which a connection cord connected with the conductive wires 127 and 128 and the temperature sensor 14 passes.

The temperature sensor 14 is so provided that it contacts the lower surface of the transparent heat-generating plate 122. The temperature sensor 14 may be provided inside the transparent heat-generating plate 122 or on the upper surface thereof. Any sensors capable of detecting temperature can be used as the temperature sensor 14. A thermocouple, a thermistor or the like can be preferably used as the temperature sensor 14.

The conductive wires 127 and 128 connected with the heat-generating electrodes 125 and 126, respectively and the signal conductor connected with the temperature sensor 14 are bundled as a cord 16 extending to the outside from the opening portion 18 of the housing 3. A connector (not shown) is installed at one end of the cord 16, thus forming a connection terminal which is connected with the temperature controller 31 described previously.

A disk-shaped heat-insulating material 134 is formed between the transparent heat-generating plate-placing portion of the housing 3 and the transparent heat-generating plate 122. A ring-shaped heat-insulating material 135 is formed between the side surface of the transparent heat-generating plate 122 and the inner side surface of the housing 3. The heat-insulating materials 134 and 135 serve as a means for reducibly transferring the heat of the transparent heat-generating plate 122 to the housing 3. As the heat-insulating materials 134 and 135, glass wool, carbon fiber or asbestos can be used.

The housing 3 is formed of a material having heat-resistant property to some extent. More specifically, the housing 3 is made of heat-resistant resin or metal. In the transparent heating instrument, because the transparent plate 5 generates heat, the space inside the housing 3 is heated. As a result, the air in the space expands and the internal pressure rises. Openings 137a and 137b for releasing the expanded air to the outside are formed on the housing 3. The openings 137a and 137b are formed on the side surface of the housing to communicate the outside with an annular space formed of the inner surface of the housing 3, the transparent plate 5, and the heat-insulating materials 134 and 135.

In the transparent heat-generating plate 122, the transparent plate 5 has a heat-ungenerating transparent conductive thin coat 9 formed on a surface (upper surface on which the transparent heat-generating conductive thin coat 7 is not formed) of the transparent plate 5, the ground cord 19 in contact with the heat-ungenerating transparent conductive thin coat 9, and the second transparent thin hard coat 11 covering the heat-ungenerating transparent conductive thin coat 9 and substantially insulating.

The heat-ungenerating transparent conductive thin coat 9 is formed on the entire upper surface of the transparent plate 5, including the portion thereof corresponding to the periphery of the transparent heat-generating conductive thin coat 7. That is, the heat-ungenerating transparent conductive thin coat 9 covers the entire upper surface of the transparent plate 5. The heat-ungenerating transparent conductive thin coat 9 may be formed of the same material as that of the transparent heat-generating conductive thin coat 7 of the embodiments described previously. Because the heat-ungenerating transparent conductive thin coat 9 is not required to generate heat when it is electrified, it may be formed of a material having a resistance lower than that of the transparent heat-generating conductive thin coat 7.

The heat-ungenerating transparent conductive thin coat 9 can be preferably formed of the following materials: Gold, copper, tin oxide, $SiO_2$-indium alloy, indium oxide, tin-doped indium oxide or antimony-doped indium oxide, antimony-doped tin oxide. The following methods can be utilized to form the conductive metal film (ITO film) on the upper surface of the transparent plate 5: Vapor deposition method (for example, vacuum vapor deposition), sputtering method, vacuum film forming method such as ion plating method, hydrolysis reaction, chemical vapor deposition method (CVD method) such as thermal decomposition reaction or dipping method.

The ground cord 19 is connected with the heat-ungenerating transparent conductive thin coat 9. Electromagnetic waves which have collided with the upper surface of the transparent plate 5 and reached the heat-ungenerating transparent conductive thin coat 9 flow through the ground cord 19, thus disappearing.

The second transparent thin hard coat 11 covering the heat-ungenerating transparent conductive thin coat 9 is formed on the upper side of the transparent plate 5. As the material of the second transparent thin hard coat 11, the same materials as those of the transparent thin hard coat 8 of the transparent heating instrument 1 can be preferably used. The second transparent thin hard coat 11 protects the upper and lower surfaces of the transparent plate 5 from being damaged easily and allows the transparent heat-generating plate 122 to have a high strength.

The transparent heating instrument for use in a microscope of the present invention comprises a transparent heat-generating plate having: a transparent plate; a transparent heat-generating conductive thin coat formed on one surface of the transparent plate; a pair of heat-generating electrodes in contact with the transparent heat-generating conductive thin coat and opposed to each other; and a transparent thin hard coat covering the transparent heat-generating conductive thin coat and having substantially insulating property. The construction allows the transparent heating plate to be sufficiently thin; does not cause the transparent heating instrument to interrupt the rotation of a magnification lens when the transparent heating instrument is fixed to the stage of an inverted microscope even though it does not have a through hole at the center part thereof; and allows the transparent heating instrument to have a high strength because it has the transparent thin hard coat.

The transparent heating instrument for use in a microscope of the present invention comprises a transparent heat-generating plate having: an ultraviolet ray-permeable transparent plate; a transparent heat-generating conductive thin coat formed on one surface of the ultraviolet ray-permeable transparent plate; a pair of heat-generating electrodes in contact with the transparent heat-generating conductive thin coat and opposed to each other; a transparent heat-generating conductive thin coat-unformed portion formed on the one surface, of the ultraviolet ray-permeable transparent plate, on which the transparent heat-generating conductive thin coat is formed; and a transparent thin hard coat covering the transparent heat-generating conductive thin coat and substantially insulating. The construction allows the transparent heating plate to be sufficiently thin; does not cause the transparent heating instrument to interrupt the rotation of a magnification lens when the transparent heating instrument is fixed to the stage of an inverted microscope even though it does not have a through hole at the center part thereof; and allows the transparent heating instrument to have a high strength because it has the transparent thin hard coat. Further, even though the inverted microscope is used, the absorption or reflection of ultraviolet ray does not occur, which allows an object to be examined easily and reliably.

The transparent heating instrument for use in a microscope of the present invention comprises a transparent heat-generating plate having: a transparent plate; a transparent heat-generating conductive thin coat formed on one surface of the transparent plate; a pair of heat-generating electrodes in contact with the transparent heat-generating conductive thin coat and opposed to each other; and conductive wires each fixed to each of the heat-generating electrodes. The transparent heat-generating plate further has a housing holding a periphery of the transparent heat-generating plate and having an opening for taking out the conductive wires therefrom; and a deformable member capable of holding the conductive wires taken out from the opening in a desired shape. Therefore, the construction prevents the magnification lens from being caught by the conductive wires of the transparent heating instrument and allows the shape of the conductive wires to be maintained.

What is claimed is:

1. A transparent heating instrument for use in a microscope comprising a transparent heat-generating plate having a transparent plate, a transparent heat-generating conductive thin coat formed on one surface of said transparent plate, a pair of heat-generating electrodes in contact with said transparent heat-generating conductive thin coat and opposed to each other and a transparent thin hard coat covering said transparent heat-generating conductive thin coat and having substantially insulating property.

2. The transparent heating instrument according to claim 1, wherein said transparent plate has a heat-ungenerating transparent conductive thin coat formed on the other surface of said transparent plate, a ground cord in contact with said heat-ungenerating transparent conductive thin coat and a second transparent thin hard coat covering said heat-ungenerating transparent conductive thin coat and substantially insulating.

3. The transparent heating instrument according to claim 2, wherein said heat-ungenerating transparent conductive thin coat covers substantially the entirety of the other surface of said transparent plate.

4. The transparent heating instrument according to claim 1, wherein said transparent thin hard coat covers said heat-generating electrodes.

5. The transparent heating instrument according to claim 1, wherein said transparent plate has a portion, in an entire periphery thereof, in which said heat-generating electrodes are formed and said transparent heat-generating conductive thin coat is not formed; and said heat-generating electrodes are positioned a little inward from the periphery of said transparent plate.

6. The transparent heating instrument according to claim 1, wherein said transparent heat-generating plate has a thickness less than 1 mm.

7. The transparent heating instrument according to claim 1, wherein said transparent thin hard coat is formed of any one of zirconium oxide, alumina, silicon oxide, titanium carbide or a composite containing two or more of these substances as a main component or a cured silicon hard coating agent.

8. The transparent heating instrument according to claim 1, wherein said transparent thin hard coat is deposited on a surface having the conductive thin coat of the transparent plate by vapor deposition, sputtering method, ion plating method, hydrolysis reaction, chemical vapor deposition method.

9. The transparent heating instrument according to claim 1, wherein said transparent thin hard coat has a thickness in the range of 0.01–100 $\mu$m.

10. A transparent heating instrument for use in a microscope comprising a transparent heat-generating plate having an ultraviolet ray-permeable transparent plate, a transparent heat-generating conductive thin coat formed on one surface of said ultraviolet ray-permeable transparent plate, a pair of heat-generating electrodes in contact with said transparent heat-generating conductive thin coat and opposed to each other, a transparent heat-generating conductive thin coat-unformed portion formed on said one surface at a center of said ultraviolet ray-permeable transparent plate, on which said transparent heat-generating conductive thin coat is formed and a transparent thin hard coat covering said transparent heat-generating conductive thin coat and substantially insulating.

11. The transparent heating instrument according to claim 10, wherein said transparent thin hard coat does not substantially cover said transparent heat-generating conductive thin coat-unformed portion.

12. The transparent heating instrument according to claim 10, wherein said transparent thin hard coat is substantially ultraviolet ray-permeable and covers said transparent heat-generating conductive thin coat-unformed portion.

13. The transparent heating instrument according to claim 10, wherein said ultraviolet ray-permeable transparent plate has a heat-generating transparent conductive thin coat formed on the other surface thereof, a transparent heat-ungenerating conductive thin coat-unformed portion which is formed in a region of said other surface of said ultraviolet ray-permeable transparent plate on which said heat-ungenerating transparent conductive thin coat is formed such that the region of said transparent heat-ungenerating conductive thin coat-unformed portion corresponds to the region of the transparent heat-generating conductive thin coat-unformed portion; a ground cord in contact with said heat-ungenerating transparent conductive thin coat and a second transparent thin hard coat covering said heat-ungenerating transparent conductive thin coat and being substantially insulating.

14. The transparent heating instrument according to claim 13, wherein said second transparent thin hard coat does not substantially cover said transparent heat-ungenerating conductive thin coat-unformed portion.

15. The transparent heating instrument according to claim 13, wherein said second transparent thin hard coat is substantially ultraviolet ray-permeable and covers said transparent heat-ungenerating conductive thin coat-unformed portion.

16. The transparent heating instrument according to claim 10, wherein said transparent thin hard coat covers said heat-generating electrodes.

17. The transparent heating instrument according to claim 10, wherein said transparent plate has a portion, in an entire periphery thereof, in which said heat-generating electrodes are formed and said transparent heat-generating conductive thin coat is not formed; and said heat-generating electrodes are positioned a little inward from the periphery of said transparent plate.

18. The transparent heating instrument according to claim 10, wherein said transparent heat-generating plate has a thickness less than 1 mm.

19. The transparent heating instrument according to claim 10, wherein said transparent thin hard coat is formed of any one of zirconium oxide, alumina, silicon oxide, titanium carbide or a composite containing two or more of these substances as a main component or a cured silicon hard coating agent.

20. The transparent heating instrument according to claim 10, wherein said transparent thin hard coat is deposited on a surface having the conductive thin coat of the transparent plate by vapor deposition, sputtering method, ion plating method, hydrolysis reaction, chemical vapor deposition method.

21. The transparent heating instrument according to claim 10, wherein said transparent thin hard coat has a thickness in the range of 0.01–100 $\mu$m.

22. A transparent heating instrument for use in a microscope comprising a transparent heat-generating plate having: a transparent plate a transparent heat-generating conductive thin coat formed on one surface of said transparent plate, a pair of heat-generating electrodes in contact with said transparent heat-generating conductive thin coat and opposed to each other and conductive wires each fixed to each of said heat-generating electrodes, a housing holding a periphery of said transparent heat-generating plate and having an opening for taking out said conductive wires therefrom and a deformable member capable of holding said conductive wires taken out from said opening in a desired shape.

23. The transparent heating instrument according to claim 22, wherein said deformable member is a metal wire or a metal plate plastically deformable and extending outward from the vicinity of said opening.

24. The transparent heating instrument according to claim 22, wherein said deformable member is a plastically deformable metal wire or metal plate wound around said conductive wire taken out from said opening.

25. A transparent heating instrument for high temperature comprising a transparent heat-generating plate having a heat-resistant transparent plate, a transparent heat-generating conductive thin coat formed on one surface of said transparent plate, a pair of heat-generating electrodes in contact with said transparent heat-generating conductive thin coat and opposed to each other and conductive wires each fixed to each of said heat-generating electrodes, wherein said heat-resistant transparent plate has a transparent heat-generating conductive thin coat-formed portion and a transparent heat-generating conductive thin coat-unformed portion, said pair of heat-generating electrodes in contact with said transparent heat-generating conductive thin coat-formed portion and having an extended portion form said transparent heat-generating conductive thin coat-formed portion to said transparent heat-generating conductive thin coat-unformed portion; and each of said conductive wires is fixed to an end portion of each of said extended portion of heat-generating electrodes.

26. The transparent heating instrument according to claim 25, wherein said transparent plate has a transparent thin hard coat covering said transparent heat-generating conductive thin coat and having substantially insulating property .

27. The transparent heating instrument according to claim 25, wherein said transparent plate has a heat-ungenerating transparent conductive thin coat formed on the other surface of said transparent plate, a ground cord in contact with said heat-ungenerating transparent conductive thin coat and a second transparent thin hard coat covering said heat-ungenerating transparent conductive thin coat and substantially insulating.

28. The transparent heating instrument according to claim 25, wherein said transparent thin hard coat is formed of any one of zirconium oxide, alumina, silicon oxide, titanium carbide or a composite containing two or more of these substances as a main component.

29. The transparent heating instrument according to claim 25, wherein said transparent thin hard coat is deposited on a surface having the conductive thin coat of the transparent plate by vapor deposition, sputtering method, ion plating method, hydrolysis reaction, chemical vapor deposition method.

30. The transparent heating instrument according to claim 25, wherein said transparent thin hard coat has a thickness in the range of 0.01–100 $\mu$m.

* * * * *

UNITED STATES PATENT AND TRADEMARK OFFICE
CERTIFICATE OF CORRECTION

PATENT NO. : 5,973,301
DATED : October 26, 1999
INVENTOR(S) : Tamotsu INOUE

It is certified that error appears in the above-indentified patent and that said Letters Patent is hereby corrected as shown below:

In Column 4, line 58, after "acrylic" delete "la".

In Column 5, line 2, delete "leas" and insert -- less --.

In Column 6, line 19, delete "$Al_2I_3$" and insert -- $Al_2O_3$ --

In Column 13, line 51, delete "ire"

In Column 15, line 64, delete "lo"

In Column 17, line 49, delete "63" and insert -- 65 --.

In Column 21, line 46, delete "healing" and insert -- heating --.

In Column 23, line 49, delete "unbeatable" and insert -- unheatable --.

In Column 25, line 38, delete "$ZiO_2$" and insert -- $ZrO_2$ --.

In Column, 29, line 3, delete "heat-generating" and insert -- heat-ungenerating --.

Signed and Sealed this

Twenty-eighth Day of November, 2000

Attest:

Q. TODD DICKINSON

*Attesting Officer*          *Director of Patents and Trademarks*